(12) United States Patent
McDonald et al.

(10) Patent No.: US 8,597,431 B2
(45) Date of Patent: Dec. 3, 2013

(54) BIOMASS PRETREATMENT

(75) Inventors: William F. McDonald, Utica, OH (US); David Charles Carlson, Yankton, SD (US); Wiley D. Bradford, Yankton, SD (US)

(73) Assignee: Andritz (USA) Inc., Glens Falls, NY (US)

( * ) Notice: Subject to any disclaimer, the term of this patent is extended or adjusted under 35 U.S.C. 154(b) by 194 days.

(21) Appl. No.: 12/888,957

(22) Filed: Sep. 23, 2010

(65) Prior Publication Data

US 2011/0079219 A1 Apr. 7, 2011

Related U.S. Application Data

(60) Provisional application No. 61/248,840, filed on Oct. 5, 2009.

(51) Int. Cl.
*C13K 1/02* (2006.01)
*B01J 19/00* (2006.01)

(52) U.S. Cl.
USPC .................................................. 127/1; 127/37

(58) Field of Classification Search
None
See application file for complete search history.

(56) References Cited

U.S. PATENT DOCUMENTS

| | | | |
|---|---|---|---|
| 4,237,226 A | 12/1980 | Grethlein | |
| 4,316,748 A | 2/1982 | Rugg et al. | |
| 4,427,453 A * | 1/1984 | Reitter | 127/1 |
| 4,612,286 A | 9/1986 | Sherman et al. | |
| 5,338,366 A | 8/1994 | Grace | |
| 5,411,594 A | 5/1995 | Brelsford | |
| 5,865,898 A | 2/1999 | Holtzapple et al. | |
| 5,876,505 A | 3/1999 | Klyosov et al. | |
| 5,916,780 A | 6/1999 | Foody et al. | |
| 6,090,595 A | 7/2000 | Foody et al. | |
| 6,409,841 B1 | 6/2002 | Lombard | |
| 6,423,145 B1 | 7/2002 | Nguyen et al. | |
| 6,660,506 B2 | 12/2003 | Nguyen | |
| 2002/0117167 A1 | 8/2002 | Schmidt et al. | |
| 2007/0148751 A1 | 6/2007 | Griffin et al. | |

(Continued)

FOREIGN PATENT DOCUMENTS

| | | |
|---|---|---|
| WO | 2007/051269 A1 | 5/2007 |
| WO | 2008/137639 A1 | 11/2008 |
| WO | WO 2008137639 A1 * | 11/2008 |

OTHER PUBLICATIONS schell et al, dilute sulfuric acid pretreatment of corn stover in pilot scale reactor, 2003, applied biochemistry and biotechnology, vols. 105-108, pp. 69-85.*

(Continued)

*Primary Examiner* — Melvin C Mayes
*Assistant Examiner* — Stefanie Cohen
(74) *Attorney, Agent, or Firm* — Nixon & Vanderhye P.C.

(57) ABSTRACT

A system for pre-treating biomass for the production of ethanol is provided. The system comprises a method for pre-treating biomass. The method comprises supplying biomass to a steaming bin, wherein the biomass is mixed with water, and inputting the steamed biomass to a first pretreatment reactor, wherein the steamed biomass comprises liquids and solids. The method also comprises removing a bulk of liquids from the solids and feeding the solids into a second pretreatment reactor. The method further comprises applying a pressure drop to the solids in the second pretreatment reactor, wherein the pressure drop opens up a structure of the solids, and sending the solids to a fermentation process for ethanol processing.

42 Claims, 34 Drawing Sheets

(56) References Cited

U.S. PATENT DOCUMENTS

| | | |
|---|---|---|
| 2008/0142181 A1 | 6/2008 | Sabourin |
| 2009/0035826 A1 | 2/2009 | Tolan et al. |
| 2009/0221814 A1 | 9/2009 | Pschorn et al. |
| 2010/0279361 A1* | 11/2010 | South et al. .................. 435/101 |

OTHER PUBLICATIONS

Yang, et al. "A Kinetic Study of Xylan Solubility and Degradation during Corncob Steaming." Biosystems Engineering (2006) 93 (4), 375-382, doi:10.1016/j.biosystemseng.2006.01.006. Last accessed Jan. 12, 2011, 8 pages.

Taherzadeh, et al. "Acid-Based Hydrolysis Processes for Ethanol from Lignocellulosic Materials : A Review." BioResources 2(3), 472-499. Last accessed Jan. 12, 2011, 28 pages.

Kim, et al. "Cellulose Hydrolysis Under Extremely Low Sulfuric Acid and High-Temperature Conditions." Applied Biochemistry and Biotechnology, vol. 91-93, 2001. Last accessed Jan. 12, 2011, 11 pages.

Lloyd, et al. "Combined Sugar Yields for Dilute Sulfuric Acid Pretreatment of Corn Stover Followed by Ezymatic Hydrolysis of the Remaining Solids." Bioresource Technology 96 (2005) 1967-1977, available online Mar. 10, 2005. Last accessed Jan. 12, 2011, 11 pages.

Martin, et al. "Dilute Sulfuric Acid Pretreatment of Agricultural and Agro-Industrial Residues for Ethanol Production." Applied Biochemistry and Biotechnology, vol. 136-140, 2007. Last accessed Jan. 12, 2011, 14 pages.

Schell, et al. "Dilute—Sulfuric Acid Pretreatment of Corn Stover in Pilot-Scale Reactor." Applied Biochemistry and Biotechnology, vol. 105-108, 2003. Last accessed Jan. 12, 2011, 19 pages.

Ohgren, et al. "Effect of hemicellulose and lignin removal on enzymatic hydrolysis of steam pretreated corn stover." Bioresour. Technol. (2006), doi:10.1016/j.biortech.2006.09.003. Last accessed Jan. 12, 2011, 8 pages.

Tucker, et al. "Effects of Temperature and Moisture on Dilute-Acid Steam Explosion Pretreatment of Corn Stover and Cellulase Enzyme Digestibility." Applied Biochemistry and Biotechnology vol. 105-108, 2003. Last accessed Jan. 12, 2011, 15 pages.

Conner, et al. "Kinetic Model for the Dilute Sulfuric Acid Saccharification of Lignocellulose." Journal of Wood Chemistry and Technology, 5(4), 461-489, 1985. Last accessed Jan. 12, 2011, 29 pages.

Lee, et al. "Kinetic and Modeling Investigation to Provide Design Guidelines for the NREL Dilute-Acid Process Aimed at Total Hydrolysis/Fractionation of Lignocellulosic Biomass." Aug. 2004, NREL/SR-510-36392. Last accessed Jan. 12, 2011, 61 pages.

Aden, et al. "Lignocellulosic Biomass to Ethanol Process Design and Economics Utilizing Co-Current Dilute Acid Prehydrolysis and Enzymatic Hydrolysis for Corn Stover." Task No. BFP2.A410, Jun. 2002, NREL/TP-510-32438. Available electronically at http://www.osti.gov/bridge, last accessed Jan. 12, 2011, 154 pages.

Grohmann, et al. "Optimization of Dilute Acid Pretreatment of Biomass." Biotechnology and Bioengineering Symp. No. 15 (1985). Last accessed Jan. 12, 2011, 22 pages.

McMillan. "Processes for Pretreating Lignocellulosic Biomass: A Review." NREL/TP-421-4978, Nov. 1992, last accessed Jan. 12, 2011, 48 pages.

Mok, et al. "Productive and Parasitic Pathways in Dilute Acid-Catalyzed Hydrolysis of Cellulose." Ind. Eng. Chem. Res., vol. 31, No. 1, 1992. Last accessed Jan. 12, 2011, 7 pages.

ISR and Written Opinion mailed Nov. 23, 2010 for International Application No. PCT/US 10/50124, 8 pages.

Zhang, et al. "Fractionating Recalcitrant Lignocellulose at Modest Reaction Conditions." Biotechnol Bioeng Jun. 1, 2007, vol. 97, No. 2, pp. 214-223, p. 219, fig.3.

* cited by examiner

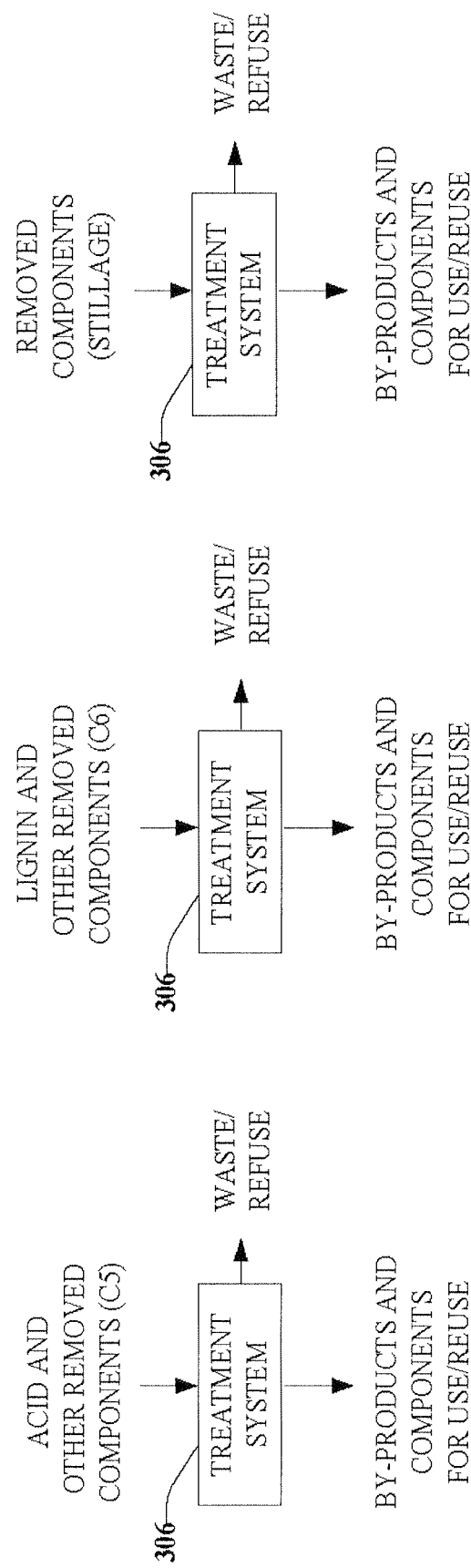

OPERATING CONDITION

Time (h)

OPERATING CONDITION

Temperature (°C)

OPERATING CONDITION pH

Glucose produced as a function of reaction temperature - without presoak.

Xylose produced as a function of reaction temperature - without presoak.

Oligomer Generation as a Function of Acid Level during Steeping at 50 degrees C.

Oligomer Generation as a Function of Acid Level during Steeping at 75 degrees C.

Oligomer Generation as a Function of Acid Level during Steeping at 100 degrees C.

Steep Time Effects on oligomer and xylose release from corn cobs at 0.5% acid loading (75 degrees C).

Steep Time Effects on oligomer and xylose release from corn cobs at 1.0% acid loading (75 degrees C).

Extended Steep Time Effects on oligomer and xylose release from corn cobs at 1.0% acid loading (75 degrees C).

Hexose Produced using elevated temperatures and reduce times.

Pentose produced using elevated temperatures and reduce times.

FIG. 26A (Table 1A)

Biomass Composition

| Cob (percent) | Husks/ Leaves (percent) | Stalk (percent) | Cellulose (Glucan) (percent) | Hemicellulose | | | | Lignin (percent) | Ash (percent) |
|---|---|---|---|---|---|---|---|---|---|
| | | | | Xylan (percent) | Arabinan (percent) | Acetate (percent) | Composite (percent) | | |
| 100 | 0 | 0 | 36.0 | 33.3 | 3.6 | 3.0 | 39.9 | 14.9 | 2.2 |
| 0 | 100 | 0 | 37.2 | 25.6 | 4.9 | 2.2 | 32.7 | 13.0 | 7.7 |
| 0 | 0 | 100 | 41.7 | 22.5 | 2.4 | 2.6 | 27.5 | 18.3 | 3.7 |
| 50 | 0 | 50 | 38.8 | 27.9 | 3.0 | 2.8 | 33.7 | 16.6 | 3.0 |
| 50 | 50 | 0 | 36.6 | 29.5 | 4.2 | 2.6 | 36.3 | 14.0 | 5.0 |
| 30 | 50 | 20 | 37.7 | 27.3 | 4.0 | 2.5 | 33.8 | 14.6 | 5.3 |

FIG. 26B (Table 1B)

Biomass Typical and Expected Composition

| | Cellulose (Glucan) (percent) (approx.) | Hemicellulose (percent) (approx.) | Lignin (percent) (approx.) | Ash (percent) (approx.) |
|---|---|---|---|---|
| Typical Range | 35-45 | 24-42 | 12-20 | 2-8 |
| Expected Range | 30-55 | 20-50 | 10-25 | 1-10 |

FIG. 27A (Table 2A)

Pre-Treated Biomass Liquid Component Composition

| Cob (percent) | Husks/ Leaves (percent) | Stalk (percent) | Glucose (percent) | Xylose (percent) | Arabinose (percent) | Acetic Acid (ppm) |
|---|---|---|---|---|---|---|
| 100 | 0 | 0 | 0.4 | 4.8 | 0.5 | 6090 |
| 0 | 100 | 0 | 0.4 | 2.7 | 0.5 | 3400 |
| 0 | 0 | 100 | 0.4 | 4.2 | 0.4 | 6180 |
| 50 | 0 | 50 | 0.4 | 4.5 | 0.4 | 6135 |
| 30 | 50 | 20 | 0.4 | 3.6 | 0.5 | 4763 |

FIG. 27B (Table 2B)

**Pre-Treated Biomass
Liquid Component
Typical and Expected Composition**

|  | Glucose (percent) (approx.) | Xylose (percent) (approx.) | Arabinose (percent) (approx.) | Acetic Acid (ppm) (approx.) |
|---|---|---|---|---|
| Typical Range | 0-1 | 2-6 | 0-1 | 3000-6400 |
| Expected Range | 0-1 | 1-8 | 0-1 | 2000-8000 |

FIG. 28A (Table 3A)

**Pre-Treated Biomass
Solids Component Composition**

| Cob (percent) | Husks/ Leaves (percent) | Stalk (percent) | Cellulose (Glucan) (percent) | Hemicellulose | | | | Lignin (percent) | Ash (percent) |
|---|---|---|---|---|---|---|---|---|---|
| | | | | Xylan (percent) | Arabinan (percent) | Acetate (percent) | Composite (percent) | | |
| 100 | 0 | 0 | 60.2 | 9.5 | 0.9 | 0.3 | 10.7 | 26.7 | 1.2 |
| 0 | 100 | 0 | 54.4 | 1.3 | 0.7 | 0.7 | 10.4 | 23.8 | 9.7 |
| 0 | 0 | 100 | 51.1 | 1.4 | 1.0 | 1.0 | 15.4 | 27.3 | 3.1 |
| 50 | 0 | 50 | 55.7 | 5.5 | 0.9 | 0.6 | 13.1 | 27.0 | 2.2 |
| 50 | 50 | 0 | 57.3 | 5.4 | 0.8 | 0.5 | 10.6 | 25.2 | 5.4 |
| 30 | 50 | 20 | 55.5 | 3.8 | 0.8 | 0.6 | 11.5 | 25.4 | 5.8 |

FIG. 28B (Table 3B)

**Pre-Treated Biomass
Solids Component
Typical and Expected Composition**

|  | Cellulose (Glucan) (percent) (approx.) | Hemicellulose (percent) (approx.) | Lignin (percent) (approx.) | Ash (percent) (approx.) |
|---|---|---|---|---|
| Typical Range | 48-62 | 8-17 | 22-30 | 1-10 |
| Expected Range | 45-65 | 5-20 | 20-32 | 1-10 |

Table 4. Experimental Design with no Presoak of the Biomass.

| Notebook Page # | Sample number | Desired Solids in Reactor (%) | Mass Cob (as is) (g) | Mass H2SO4 (g) | Mass H2O (g) | Reaction Temp (°C) | Reaction Time (min) |
|---|---|---|---|---|---|---|---|
| SU443-46 | 1 | 30 | 113.76 | 1.75 | 234.45 | 150 | 10 |
| SU443-46 | 2 | 30 | 113.76 | 1.75 | 234.45 | 160 | 10 |
| SU443-46 | 3 | 30 | 113.76 | 1.75 | 234.45 | 170 | 10 |
| SU443-46 | 4 | 30 | 114.79 | 1.75 | 234.45 | 180 | 10 |
| SU443-46 | 5 | 30 | 114.79 | 1.75 | 234.45 | 190 | 10 |
| SU443-46 | 6 | 40 | 151.70 | 1.75 | 196.55 | 150 | 10 |
| SU443-46 | 7 | 40 | 151.70 | 1.75 | 196.55 | 160 | 10 |
| SU443-46 | 8 | 40 | 151.70 | 1.75 | 196.55 | 170 | 10 |
| SU443-46 | 9 | 40 | 151.70 | 1.75 | 196.55 | 180 | 10 |
| SU443-46 | 10 | 40 | 151.70 | 1.75 | 196.55 | 190 | 10 |
| SU443-46 | 11 | 30 | 114.79 | 6.89 | 229.31 | 150 | 10 |
| SU443-46 | 12 | 40 | 151.70 | 9.10 | 189.20 | 150 | 10 |
| SU443-46 | 13 | 30 | 114.79 | 0 | 236.20 | 150 | 10 |
| SU443-46 | 14 | 30 | 114.79 | 0 | 236.20 | 160 | 10 |
| SU443-46 | 15 | 30 | 114.79 | 0 | 236.20 | 170 | 10 |
| SU443-46 | 16 | 30 | 114.79 | 0 | 236.20 | 180 | 10 |
| SU443-46 | 17 | 30 | 114.79 | 0 | 236.20 | 190 | 10 |
| SU443-46 | 18 | 40 | 151.70 | 0 | 198.30 | 150 | 10 |
| SU443-46 | 19 | 40 | 151.70 | 0 | 198.30 | 160 | 10 |
| SU443-46 | 20 | 40 | 151.70 | 0 | 198.30 | 170 | 10 |
| SU443-46 | 21 | 40 | 151.70 | 0 | 198.30 | 180 | 10 |
| SU443-46 | 22 | 40 | 151.70 | 0 | 198.30 | 190 | 10 |

FIG. 29

Table 5. Acid Steeping Experimental design using Corn Cobs as the Biomass

| Sample ID | Acid Conc %w/w | Time min | Temp °C |
|---|---|---|---|
| RB451L 8101 | 0.25 | 10 | 50 |
| RB451L 8102 | 0.25 | 10 | 75 |
| RB451L 8103 | 0.25 | 10 | 100 |
| RB451L 8104 | 0.25 | 20 | 75 |
| RB451L 8105 | 0.25 | 30 | 75 |
| RB451L 8106 | 0.5 | 10 | 50 |
| RB451L 8107 | 0.5 | 10 | 75 |
| RB451L 8108 | 0.5 | 10 | 100 |
| RB451L 8109 | 0.5 | 20 | 75 |
| RB451L 8110 | 0.5 | 30 | 75 |
| RB451L 8111 | 1 | 10 | 50 |
| RB451L 8112 | 1 | 10 | 75 |
| RB451L 8113 | 1 | 10 | 100 |
| RB451L 8114 | 1 | 20 | 75 |
| RB451L 8115 | 1 | 30 | 75 |
| RB451L 8116 | 4 | 10 | 50 |
| RB451L 8117 | 4 | 10 | 75 |
| RB451L 8118 | 4 | 10 | 100 |
| RB451L 8119 | 4 | 20 | 75 |
| RB451L 8120 | 4 | 30 | 75 |
| RB451L 8121 | 2 | 10 | 50 |
| RB451L 8122 | 2 | 10 | 75 |
| RB451L 8123 | 2 | 10 | 100 |
| RB451L 8124 | 2 | 20 | 75 |
| RB451L 8125 | 2 | 30 | 75 |

FIG. 30

Table 6. Conditions and yields from saccharification of acid steeped glucan solids

| Sample ID | Acid (%) | Time (hours) | Temp (°C) | Enzyme loading (mg Protein/g glucan) | 72 Hour Glucose Yield (%) | Overall Xylose Yield (%) |
|---|---|---|---|---|---|---|
| RB471-0801 | 0.25 | 1 | 50 | 9.00 | 5.32 | 0.76 |
| RB471-0803 | 0.25 | 4 | 50 | 9.00 | 4.54 | 0.40 |
| RB471-0804 | 0.25 | 1 | 75 | 9.00 | 8.12 | 0.88 |
| RB471-0806 | 0.25 | 4 | 75 | 9.00 | 12.00 | 0.46 |
| RB471-0807 | 0.25 | 1 | 100 | 9.00 | 9.54 | 1.72 |
| RB471-0809 | 0.25 | 4 | 100 | 9.00 | 25.05 | 16.95 |
| RB471-0810 | 0.50 | 1 | 50 | 9.00 | 2.44 | 4.03 |
| RB471-0812 | 0.50 | 4 | 50 | 9.00 | 6.66 | 3.90 |
| RB471-0813 | 0.50 | 1 | 75 | 9.00 | 9.93 | 4.32 |
| RB471-0815 | 0.50 | 4 | 75 | 9.00 | 12.78 | 7.20 |
| RB471-0816 | 0.50 | 1 | 100 | 9.00 | 25.89 | 28.19 |
| RB471-0818 | 0.50 | 4 | 100 | 7.86 | 32.78 | 48.73 |
| RB471-0819 | 1.00 | 1 | 50 | 9.00 | 9.20 | 14.95 |
| RB471-0821 | 1.00 | 4 | 50 | 9.00 | 5.54 | 15.80 |
| RB471-0822 | 1.00 | 1 | 75 | 9.00 | 10.83 | 15.95 |
| RB471-0824 | 1.00 | 4 | 75 | 9.00 | 17.76 | 23.61 |
| RB471-0825 | 1.00 | 1 | 100 | 6.28 | 64.99 | 90.39 |
| RB471-0827 | 1.00 | 4 | 100 | 6.28 | 45.52 | 83.57 |

FIG. 31

BIOMASS PRETREATMENT

CROSS REFERENCE TO RELATED APPLICATIONS

The present application claims priority to and incorporates by reference U.S. Provisional Application Ser. No. 61/248,840, titled "BIOMASS PRETREATMENT", filed on Oct. 5, 2009.

FIELD

The present invention relates to a system for treatment of biomass to be used in the production of ethanol. The present invention also relates to a system for biomass pretreatment.

BACKGROUND

Ethanol can be produced from grain-based feedstocks (e.g. corn, sorghum/milo, barley, wheat, soybeans, etc.), from sugar (e.g. from sugar cane, sugar beets, etc.), and from biomass (e.g. from lignocellulosic feedstocks such as switchgrass, corn cobs and stover, wood or other plant material).

Biomass comprises plant matter that can be suitable for direct use as a fuel/energy source or as a feedstock for processing into another bioproduct (e.g., a biofuel such as cellulosic ethanol) produced at a biorefinery (such as an ethanol plant). Biomass may comprise, for example, corn cobs and stover (e.g., stalks and leaves) made available during or after harvesting of the corn kernels, fiber from the corn kernel, switchgrass, farm or agricultural residue, wood chips or other wood waste, and other plant matter (grown for processing into bioproducts or for other purposes). In order to be used or processed, biomass will be harvested and collected from the field and transported to the location where it is to be used or processed.

In a conventional ethanol plant producing ethanol from corn, ethanol is produced from starch. Corn kernels are cleaned and milled to prepare starch-containing material for processing. (Corn kernels can also be fractionated to separate the starch-containing material (e.g. endosperm) from other matter (such as fiber and germ). The starch-containing material is slurried with water and liquefied to facilitate saccharification where the starch is converted into sugar (e.g. glucose) and fermentation where the sugar is converted by an ethanologen (e.g. yeast) into ethanol. The product of fermentation (e.g. fermentation product) is beer, which comprises a liquid component containing ethanol and water and soluble components, and a solids component containing unfermented particulate matter (among other things). The fermentation product is sent to a distillation system. In the distillation system, the fermentation product is distilled and dehydrated into ethanol. The residual matter (e.g. whole stillage) comprises water, soluble components, oil and unfermented solids (e.g. the solids component of the beer with substantially all ethanol removed that can be dried into dried distillers grains (DDG) and sold as an animal feed product). Other co-products, for example syrup (and oil contained in the syrup), can also be recovered from the stillage. Water removed from the fermentation product in distillation can be treated for re-use at the plant.

In a biorefinery configured to produce ethanol from biomass, ethanol is produced from lignocellulosic material. Lignocellulosic biomass typically comprises cellulose, hemicellulose and lignin. Cellulose (a type of glucan) is a polysaccharide comprising hexose (C6) sugar monomers such as glucose linked in linear chains. Hemicellulose is a branched chain polysaccharide that may comprise several different pentose (C5) sugar monomers (such as xylose and arabinose) and small amounts of hexose (C6) sugar monomers (such as mannose, galactose, rhamnose and glucose) in branched chains.

The biomass is prepared so that sugars in the lignocellulosic material (such as glucose from the cellulose and xylose from the hemicellulose) can be made accessible and fermented into a fermentation product from which ethanol can be recovered. After fermentation, the fermentation product is sent to the distillation system, where the ethanol is recovered by distillation and dehydration. Other bioproducts such as lignin and organic acids may also be recovered as byproducts or co-products during the processing of biomass into ethanol. Determination of how to more efficiently prepare and treat the biomass for production into ethanol will depend upon the source and type or composition of the biomass. Biomass of different types or from different sources is likely to vary in properties and composition (e.g. relative amounts of cellulose, hemicellulose, lignin and other components). For example, the composition of wood chips will differ from the composition of corn cobs or switchgrass.

To completely realize the potential for converting biomass to ethanol, it is beneficial to more fully convert hemicellulose and cellulose from polysaccharides to sugars. Glucose and xylose are the primary sugars in most agricultural residues. It would be advantageous to provide for a system for biomass pretreatment that provides an efficient method of obtaining glucose from cellulose and xylose from hemicellulose in a form that preserves the potential for developing a crude xylose stream and a cellulose solid, which are both fermented.

Dilute acid pretreatment as a first step in a lignocellulosic process is an effective means of hydrolyzing a significant portion of the structural polysaccharides to monomer sugars and more easily digestible polysaccharide chains. A problem associated with dilute-acid pretreatment is poor fermentability of the resulting hydrolysates. A broad range of compounds are liberated and formed during the acid attack and many are toxic to the fermenting microorganism. Thus, it would be advantageous to provide for a new pretreatment process that minimizes the development of the inhibitors, reduces the energy requirements of the process, and mitigates the overall operating expenses of the corresponding ethanol production facility.

SUMMARY

The present invention relates to a system for pre-treating biomass for the production of ethanol is disclosed. The system comprises a method for pre-treating biomass. The method comprises supplying biomass to a steaming bin, wherein the biomass is mixed with water, and inputting the steamed biomass to a first pretreatment reactor, wherein the steamed biomass comprises liquids and solids. The method also comprises removing a bulk of liquids from the solids and feeding the solids into a second pretreatment reactor. The method further comprises applying a pressure drop to the solids in the second pretreatment reactor, wherein the pressure drop opens up a structure of the solids, and sending the solids to a fermentation process for ethanol processing.

The present invention also relates to an apparatus for pre-treating biomass. The apparatus comprises a steaming bin that receives and pre-steams biomass, wherein the biomass includes water. The apparatus also comprises a first pretreatment reactor that receives the pre-steamed biomass, wherein the pre-steamed biomass includes acid, liquids, and solids.

Also included in the apparatus is a drainer that removes at least some portion of the liquids from the solids to generate substantial solids. A second pretreatment reactor that receives and applies a pressure drop to the substantial solids is included in the apparatus, wherein the pressure drop opens up a structure of the substantial solids. Further, the apparatus includes a valve that sends the substantial solids to at least one of a saccharification process or a fermentation process for ethanol processing.

DESCRIPTION OF THE DRAWINGS

FIGS. 4A, 4B and 4C are schematic block diagrams of systems for treatment and processing of components from the production of ethanol from biomass.

FIGS. 26A and 26B are Tables 1A and 1A, respectively, reporting biomass compositions.

FIGS. 27A and 27B are Tables 2A and 2B, respectively.

FIGS. 28A and 28B are Tables 3A and 3B, respectively.

FIG. 29 is Table 4.

FIG. 30 is Table 5.

FIG. 31 is Table 6.

TABLES 1A and 1B list the composition of biomass comprising lignocellulosic plant material from the corn plant according to exemplary and representative embodiments.

TABLES 2A and 2B list the composition of the liquid component of pre-treated biomass according to exemplary and representative embodiments.

TABLES 3A and 3B list the composition of the solids component of pre-treated biomass according to exemplary and representative embodiments.

TABLE 4 shows parameters for the experimental design for Example 1.

TABLE 5 shows parameters of the experimental design for Examples 2 through 7.

TABLE 6 shows the pretreatment conditions, enzyme loading (estimated enzyme loading if compositional data is not released), and estimated glucose yield from saccharification of acid steeped glucan solids.

DESCRIPTION OF THE EMBODIMENTS

Figure 1A:
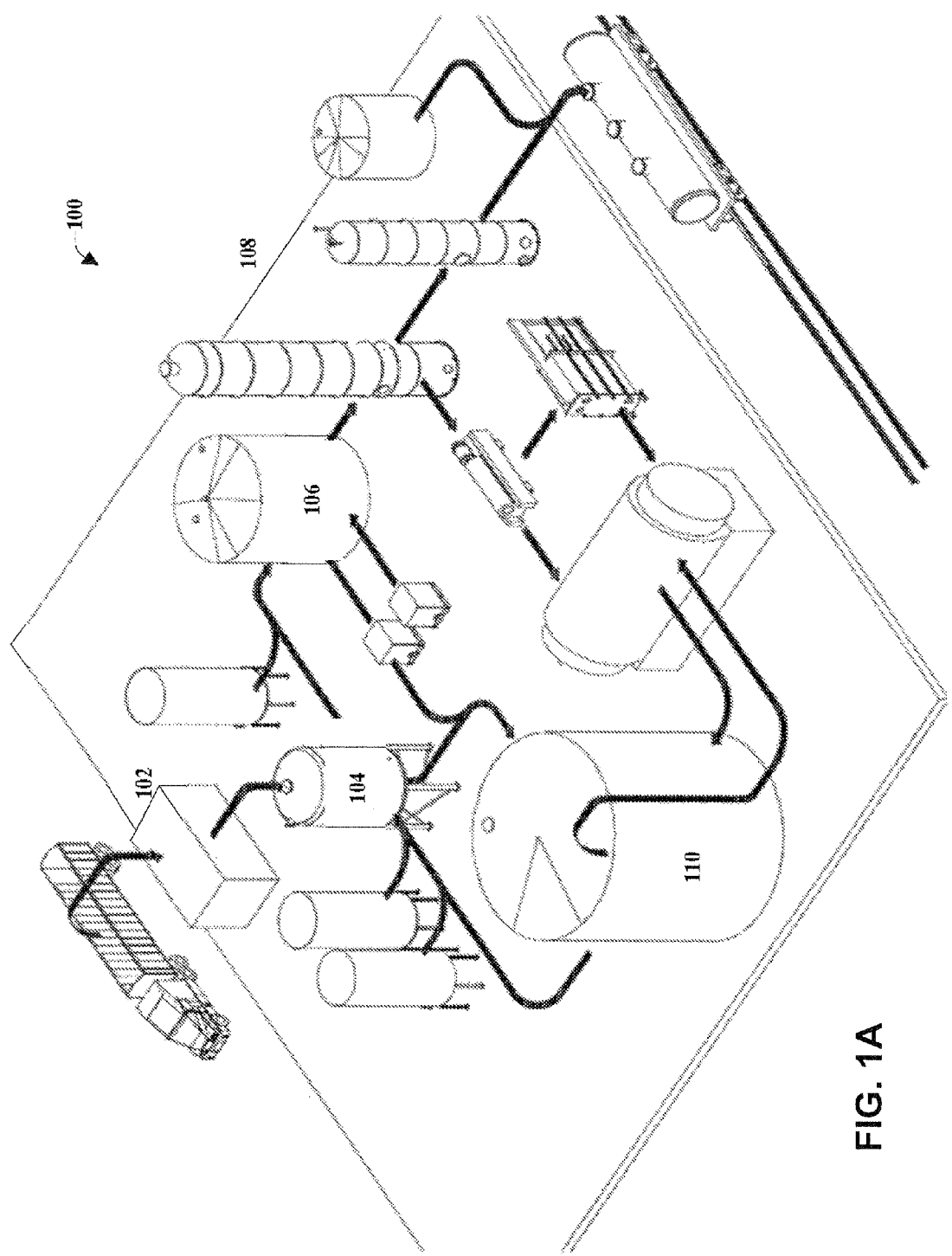
FIG. 1A is a perspective view of a biorefinery comprising a cellulosic ethanol production facility.

Referring to FIG. 1A, a biorefinery 100 configured to produce ethanol from biomass is shown.

According to an exemplary embodiment, the biorefinery 100 is configured to produce ethanol from biomass in the form of a lignocellulosic feedstock such as plant material from the corn plant (e.g. corn cobs and corn stover). Lignocellulosic feedstock such as lignocellulosic material from the corn plant comprises cellulose (from which C6 sugars such as glucose can be made available) and/or hemicellulose (from which C5 sugars such as xylose and arabinose can be made available).

As shown in FIG. 1A, the biorefinery comprises an area where biomass is delivered and prepared to be supplied to the cellulosic ethanol production facility. The cellulosic ethanol production facility comprises apparatus for preparation 102, pre-treatment 104 and treatment of the biomass into treated biomass suitable for fermentation into fermentation product in a fermentation system 106. The facility comprises a distillation system 108 in which the fermentation product is distilled and dehydrated into ethanol. As shown in FIG. 1A, the biorefinery may also comprise a waste treatment system 110 (shown as comprising an anaerobic digester and a generator). According to other alternative embodiments, the waste treatment system may comprise other equipment configured to treat, process and recover components from the cellulosic ethanol production process, such as a solid/waste fuel boiler, anaerobic digester, aerobic digester or other biochemical or chemical reactors.

Figure 1B:
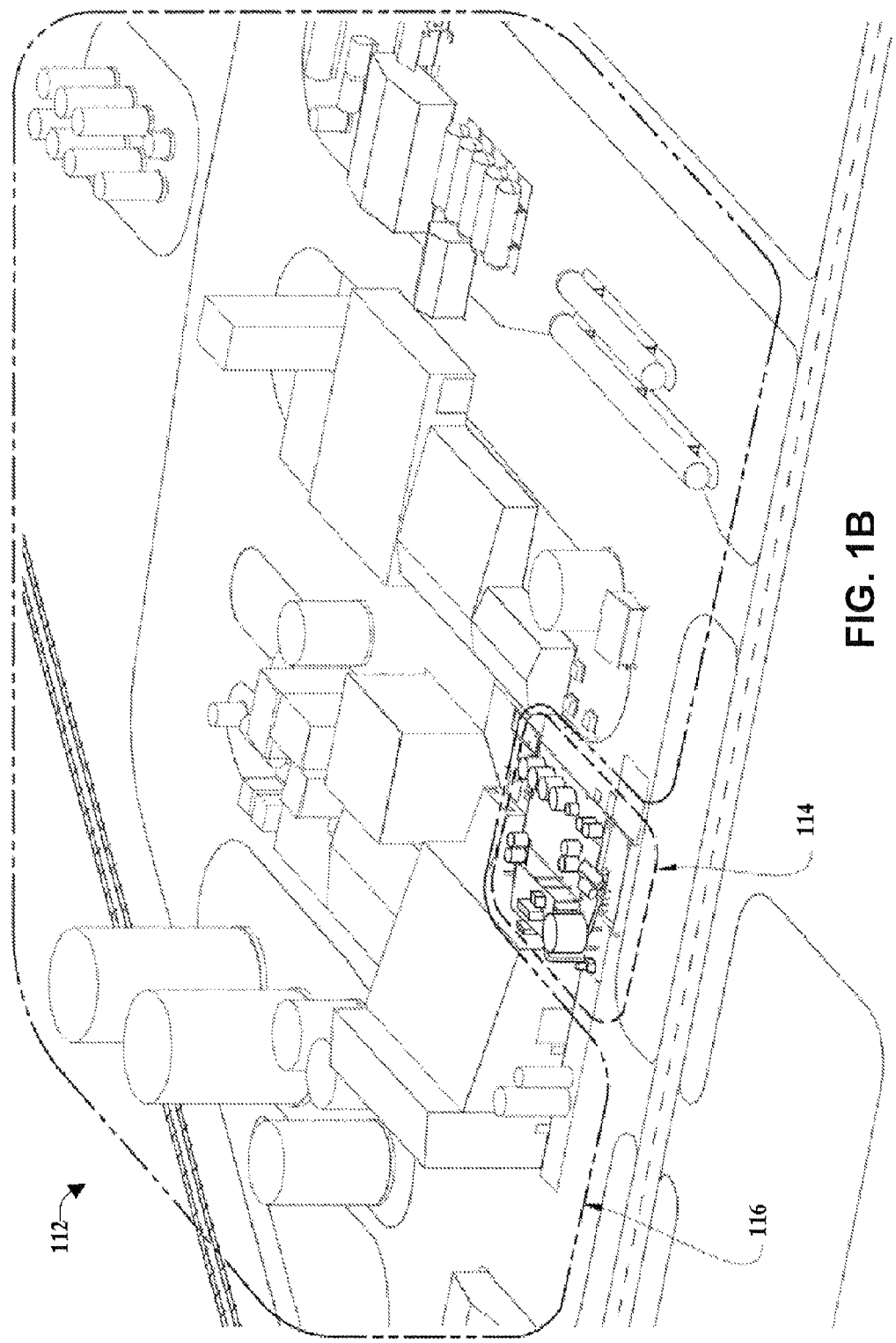
FIG. 1B is a perspective view of a biorefinery comprising a cellulosic ethanol production facility and a corn-based ethanol production facility.

As shown in FIG. 1B, according to an exemplary embodiment, a biorefinery 112 may comprise a cellulosic ethanol production facility 114 (which produces ethanol from lignocellulosic material and components of the corn plant) co-located with a corn-based ethanol production facility 116 (which produces ethanol from starch contained in the endosperm component of the corn kernel). As indicated in FIG. 1B, by co-locating the two ethanol production facilities, certain plant systems may be shared, for example, systems for dehydration, storage, denaturing and transportation of ethanol, energy/fuel-to-energy generation systems, plant management and control systems, and other systems. Corn fiber (a component of the corn kernel), which can be made available when the corn kernel is prepared for milling (e.g. by fractionation) in the corn-based ethanol production facility, may be supplied to the cellulosic ethanol production facility as a feedstock. Fuel or energy sources such as methane or lignin from the cellulosic ethanol production facility may be used to supply power to either or both co-located facilities. According to other alternative embodiments, a biorefinery (e.g. a cellulosic ethanol production facility) may be co-located with other types of plants and facilities, for example an electric power plant, a waste treatment facility, a lumber mill, a paper plant or a facility that processes agricultural products.

Figure 2:
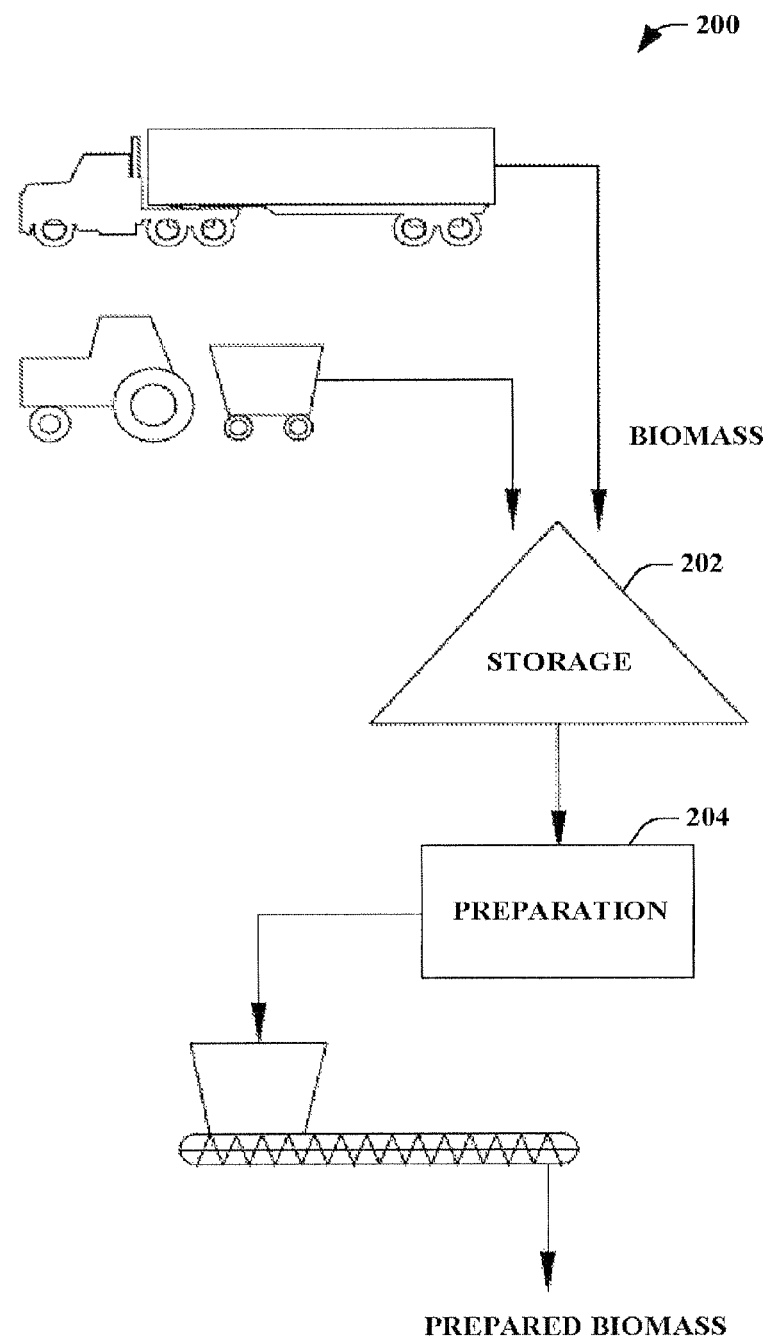
FIG. 2 is a schematic diagram of a system for receipt and preparation of biomass for a cellulosic ethanol production facility.

Referring to FIG. 2, a system 200 for preparation of biomass delivered to the biorefinery is shown. The biomass preparation system may comprise apparatus for receipt/unloading of the biomass, cleaning (e.g. removal of foreign matter), grinding (e.g. milling, reduction or densification), and transport and conveyance for processing at the plant. According to an exemplary embodiment, biomass in the form of corn cobs and stover may be delivered to the biorefinery and stored (e.g. in bales, piles or bins, etc.), shown as storage 202, and managed for use at the facility. According to a yet another embodiment, the biomass may comprise at least 20 to 30 percent corn cobs (by weight) with corn stover and other matter. According to other exemplary embodiments, the preparation system 204 of the biorefinery may be configured to prepare any of a wide variety of types of biomass (e.g. plant material) for treatment and processing into ethanol and other bioproducts at the plant.

Figure 3:
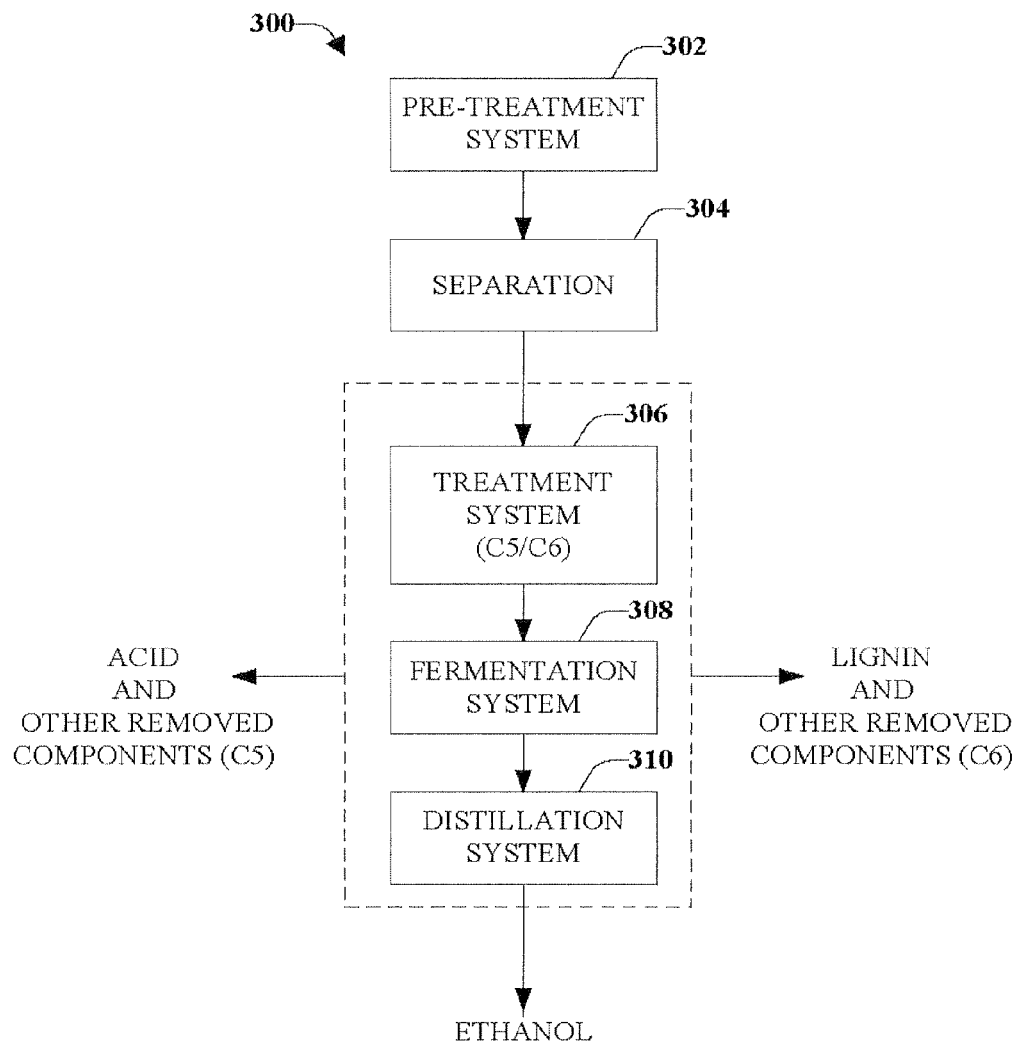
FIG. 3 is a schematic block diagram of a system for the production of ethanol from biomass.

Referring to FIG. 3, a schematic diagram of the cellulosic ethanol production facility 300 is shown. According to an embodiment, biomass comprising plant material from the corn plant is prepared and cleaned at a preparation system. After preparation, the biomass is mixed with water into a slurry and is pre-treated at a pre-treatment system 302. In the pre-treatment system 302, the biomass is broken down (e.g. by hydrolysis) to facilitate separation 304 into a liquid component (e.g. a stream comprising the C5 sugars) and a solids component (e.g. a stream comprising cellulose from which the C6 sugars can be made available). The C5-sugar-containing liquid component (C5 stream) and C6-sugar-containing solids component (C6 stream) can be treated in a treatment system 306 (as may be suitable) and fermented in a fermentation system 308. Fermentation product from the fermentation system 308 is supplied to a distillation system 310 where the ethanol is recovered.

As shown in FIGS. 3 and 4A, removed components from treatment of the C5 stream can be treated or processed to recover by-products, such as organic acids and furfural. As shown in FIGS. 3 and 4B, removed components from treatment of the C6 stream, such as lignin or other components, can be treated or processed into bioproducts or into fuel (such as lignin for a solid fuel boiler or methane produced by treatment of residual/removed matter such as acids and lignin in an anaerobic digester). As shown in FIGS. 4A, 4B and 4C, components removed during treatment and production of ethanol from the biomass from either or both the C5stream and the C6 stream (or at distillation) may be processed into bioproducts (e.g. by-products or co-products) or recovered for use or reuse. As shown in FIG. 4C, removed components from the distillation system (such as stillage or removed solids) or from the treatment of the fermentation product before distillation (e.g. removed solids and particulate matter, which may comprise residual lignin, etc.) can be treated or processed into bioproducts or fuel (e.g. methane produced in an anerobic digester).

According to an embodiment, the biomass comprises plant material from the corn plant, such as corn cobs, husks and leaves and stalks (e.g. at least upper half or three-quarters portion of the stalk); the composition of the plant material (e.g. cellulose, hemicellulose and lignin) will be approximately as indicated in TABLES 1A and 1B (e.g. after at least initial preparation of the biomass, including removal of any foreign matter). According to an embodiment, the plant material comprises corn cobs, husks/leaves and stalks; for example, the plant material may comprise (by weight) up to 100 percent cobs, up to 100 percent husks/leaves, approximately 50 percent cobs and approximately 50 percent husks/leaves, approximately 30 percent cobs and approximately 50 percent husks/leaves and approximately 20 percent stalks, or any of a wide variety of other combinations of cobs, husks/leaves and stalks from the corn plant. See TABLE 1A. According to an alternative embodiment, the lignocellulosic plant material may comprise fiber from the corn kernel (e.g. in some combination with other plant material). TABLE 1B provides typical and expected ranges believed to be representative of the composition of biomass comprising lignocellulosic material from the corn plant. According to exemplary embodiments, the lignocellulosic plant material of the biomass (from the corn plant) will comprise (by weight) cellulose at about 30 to 55 percent, hemicellulose at about 20 to 50 percent, and lignin at about 10 to 25 percent; according to a particular embodiment, the lignocellulosic plant material of the biomass (e.g. cobs, husks/leaves and stalk portions from the corn plant) will comprise (by weight) cellulose at about 35 to 45 percent, hemicellulose at about 24 to 42 percent, and lignin at about 12 to 20 percent. According to a particular embodiment, pre-treatment of the biomass will yield a liquid component that comprises (by weight) xylose at no less than 1.0 percent and a solids component that comprises (by weight) cellulose (from which glucose can be made available) at no less than 45 percent.

Figure 5A:
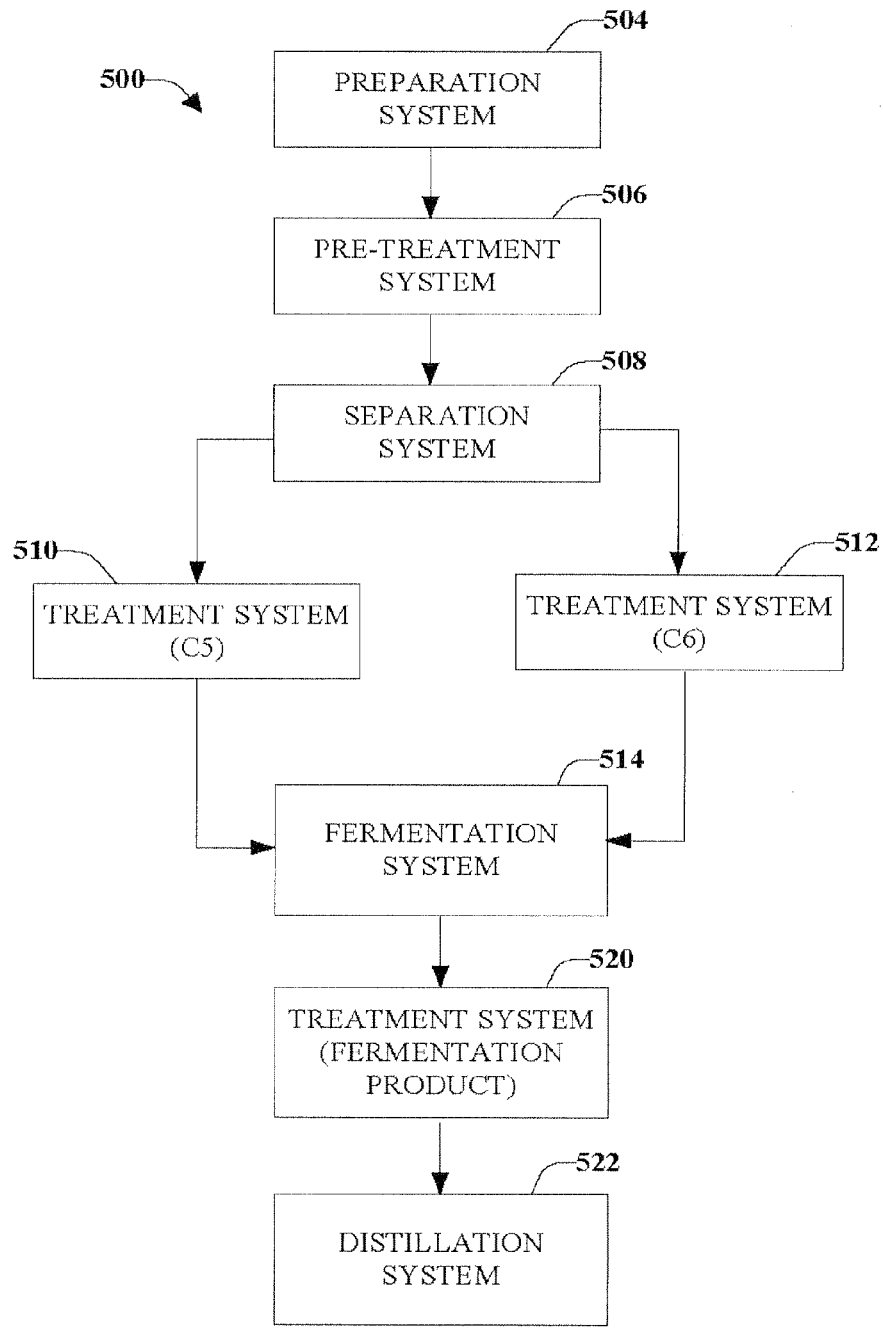
FIGS. 5A and 5B are schematic diagrams of the process flow for systems for the production of ethanol from biomass.
Figure 5B:
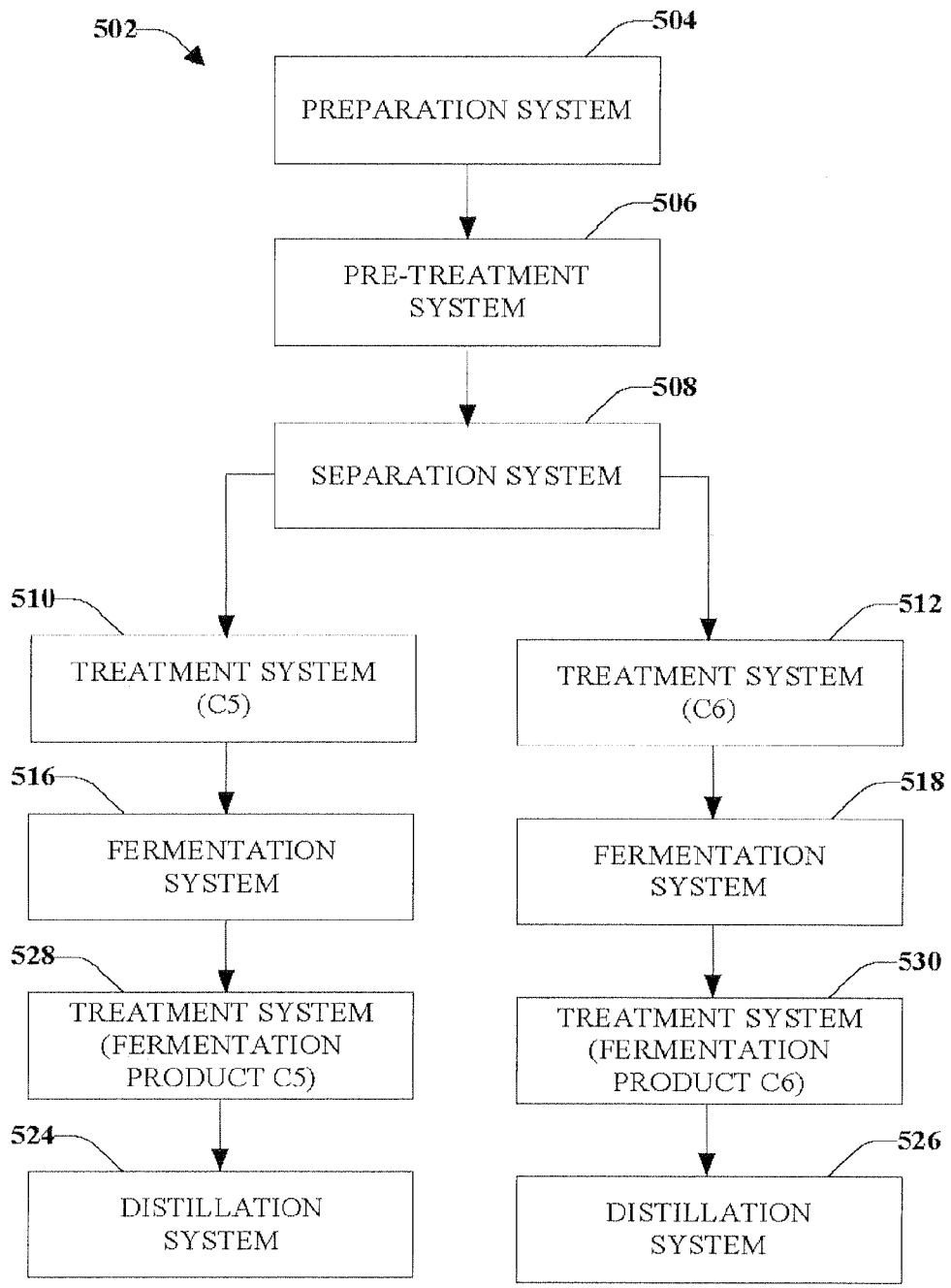

Referring to FIGS. 5A and 5B, exemplary embodiments of systems 500, 502 for the production of ethanol from biomass are shown. As shown in FIGS. 5A and 5B, biomass is prepared and cleaned at a preparation system 504 and is pre-treated in a pre-treatment system 506 and then separated (in a separation system 508) into a liquid component and a solids component.

According to a yet another embodiment, in the pre-treatment system an acid will be applied to the prepared biomass to facilitate the breakdown of the biomass for separation into the liquid component (C5 stream from which fermentable C5 sugars can be recovered) and the solids component (C6 stream from which fermentable C6 sugars can be accessed). According to an embodiment, the acid can be applied to the biomass in a reaction vessel under determined operating conditions (e.g. acid concentration, pH, temperature, time, pressure, solids loading, flow rate, supply of process water or steam, etc.) and the biomass can be agitated/mixed in the reaction vessel to facilitate the breakdown of the biomass. According to exemplary embodiments, an acid such as sulfuric acid, hydrochloric acid, nitric acid, phosphoric acid, acetic acid, etc. (or a formulation/mixture of acids) can be applied to the biomass. According to yet another embodiment, sulfuric acid will be applied to the biomass in pre-treatment.

The liquid component (C5 stream) comprises water, dissolved sugars (such as xylose, arabinose and glucose) to be made available for fermentation into ethanol, acids and other soluble components recovered from the hemicellulose. (TABLE 2B provides typical and expected ranges believed to be representative of the composition of biomass comprising lignocellulosic material from the corn plant.)

According to an exemplary embodiment, the liquid component may comprise approximately 5 to 7 percent solids (e.g. suspended/residual solids such as partially-hydrolyzed hemicellulose, cellulose and lignin). According to a yet another embodiment, the liquid component will comprise at least 2 to 4 percent xylose (by weight); according to other exemplary embodiments, the liquid component will comprise no less than 1 to 2 percent xylose (by weight). TABLES 2A and 2B list the composition of the liquid component of pre-treated biomass (from prepared biomass as indicated in TABLES 1A and 1B) according to exemplary and representative embodiments.

The solids component (C6 stream) comprises water, acids and solids such as cellulose from which sugar, such as glucose, can be made available for fermentation into ethanol, and lignin. (TABLE 3B provides typical and expected ranges believed to be representative of the composition of biomass comprising lignocellulosic material from the corn plant.) According to yet another embodiment, the solids component may comprise approximately 10 to 40 percent solids (by weight) (after separation); according to an embodiment, the solids component will comprise approximately 20 to 30 percent solids (by weight). According to yet another embodiment, the solids in the solids component comprise no less than 30 percent cellulose and the solids component may also comprise other dissolved sugars (e.g. glucose and xylose). TABLES 3A and 3B list the composition of the solids component of pre-treated biomass (from prepared biomass as indicated in TABLES 1A and 1B) according to exemplary and representative embodiments.

During pre-treatment, the severity of operating conditions (such as pH, temperature and time) may cause formation of components that are inhibitory to fermentation. For example, under some conditions, the dehydration of C5 sugars (such as xylose or arabinose) may cause the formation of furfural. Acetic acid may also be formed, for example when acetate is released during the break down of hemicellulose in pre-treatment. Sulfuric acid, which may be added to prepared biomass to facilitate pre-treatment, if not removed or neutralized, may also be inhibitory to fermentation. According to an exemplary embodiment, by adjusting pre-treatment conditions (such as pH, temperature and time), the formation of inhibitors can be reduced or managed; according to other exemplary embodiments, components of the pre-treated biomass may be given further treatment to remove or reduce the level of inhibitors (or other undesirable matter).

Referring to FIGS. 5A and 5B, after pre-treatment and separation the C5 stream and the C6 stream are processed separately; as shown, the C5 stream and the C6 stream may be processed separately (in separate treatment systems 510, 512) prior to co-fermentation 514 (C5/C6 fermentation as shown in FIG. 5A) or processed separately (in separate treatment systems 510, 512) including separate fermentation (separate C5 fermentation and C6 fermentation 516, 518 as shown in FIG. 5B).

Treatment of the C5 stream (liquid component) of the biomass may be performed in an effort to remove components that are inhibitory to efficient fermentation (e.g. furfural, HMF, sulfuric acid and acetic acid) and residual lignin (or other matter) that may not be fermentable from the C5 sugar component so that the sugars (e.g. xylose, arabinose, as well as other sugars such as glucose) are available for fermentation. The C5 sugars in the C5 stream may also be concentrated to improve the efficiency of fermentation (e.g. to improve the titer of ethanol for distillation).

Treatment of the C6 stream (solids component) of the biomass may be performed to make the C6 sugars available for fermentation. According to yet another embodiment, hydrolysis (such as enzyme hydrolysis) may be performed to access the C6 sugars in the cellulose; treatment may also be performed in an effort to remove lignin and other non-fermentable components in the C6 stream (or to remove components such as residual acid or acids that may be inhibitory to efficient fermentation).

According to an exemplary embodiment shown in FIG. 5A, after pre-treatment and separation the C5 stream and the C6 stream can be treated separately and subsequently combined after treatment (e.g. as a slurry) for co-fermentation 514 in the fermentation system to produce a C5/C6 fermentation product from the available sugars (e.g. xylose and glucose); the C5/C6 fermentation product can (after treatment 520, if any) be supplied to the distillation system 522 for recovery of the ethanol (e.g. through distillation and dehydration). According to an exemplary embodiment shown in FIG. 5B, the C5 stream and the C6 stream can each be separately processed through fermentation 516, 518 and distillation 524, 526 (after treatment 528, 530, if any) to produce ethanol. According to some embodiments, a suitable fermenting organism (ethanologen) will be used in the fermentation system; the selection of an ethanologen may be based on various considerations, such as the predominant types of sugars present in the slurry. Dehydration and/or denaturing of the ethanol produced from the C5 stream and the C6 stream may be performed either separately or in combination.

Figure 6A:
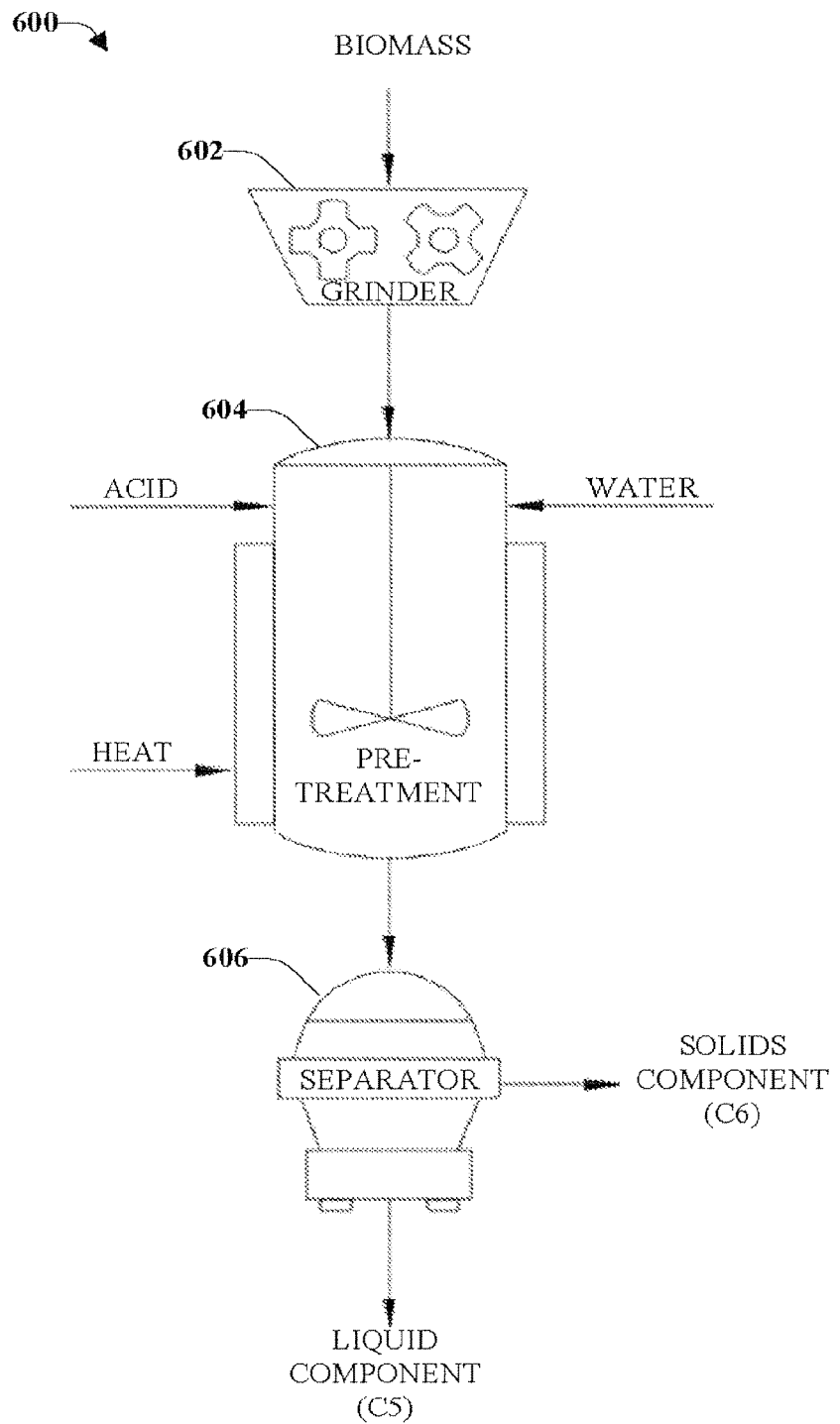
FIG. 6A is a schematic block diagram of an apparatus used for preparation, pre-treatment and separation of biomass.
Figure 6B:
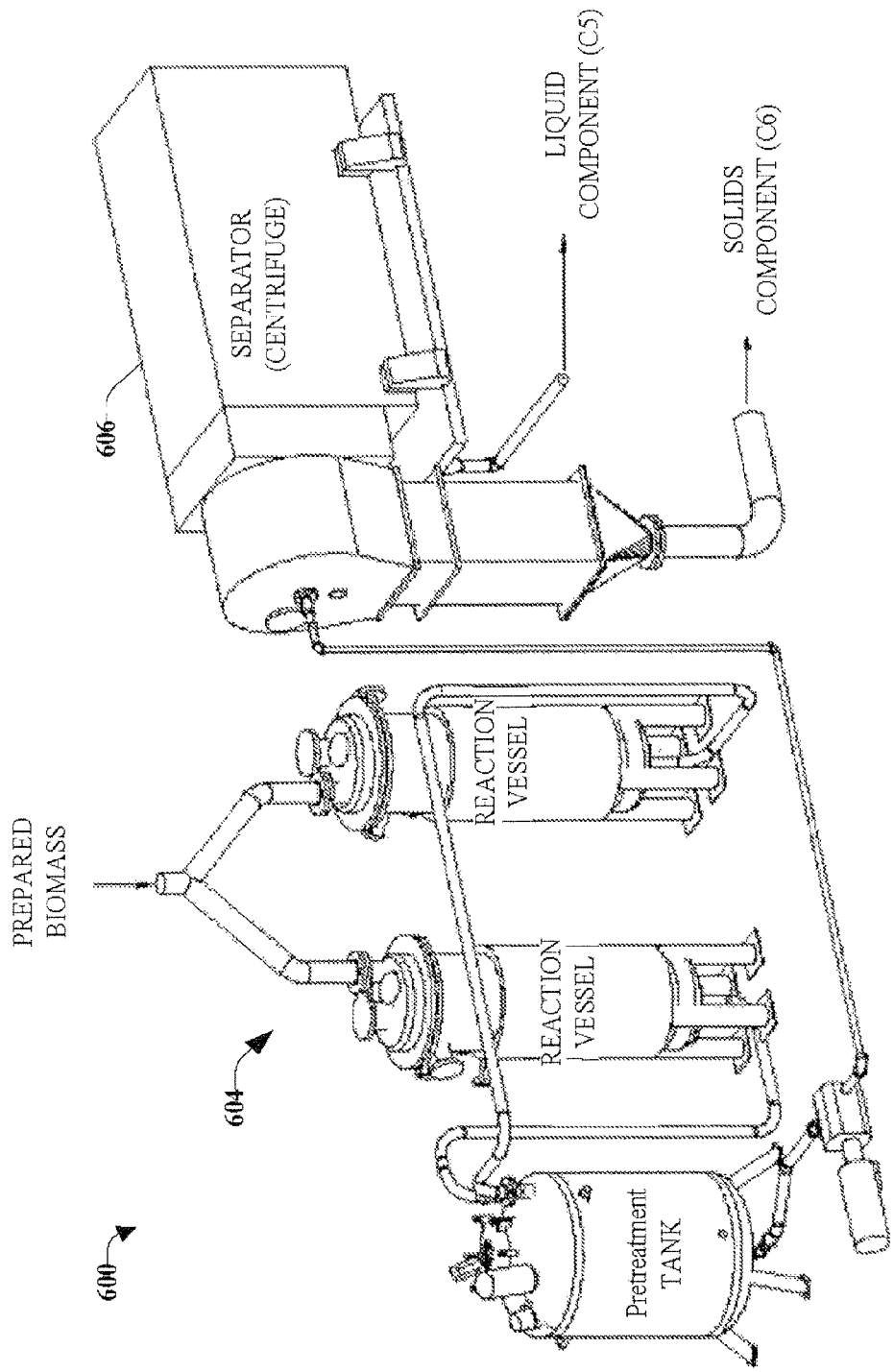
FIG. 6B is a perspective view of an apparatus used to pre-treat and separate the biomass.

FIGS. 6A and 6B show the apparatus 600 used for preparation, pre-treatment and separation of lignocellulosic biomass according to an exemplary embodiment. As shown, biomass is prepared in a grinder 602 (e.g. grinder or other suitable apparatus or mill). Pre-treatment 604 of the prepared biomass is performed in a reaction vessel (or set of reaction vessels) supplied with prepared biomass and acid/water in a predetermined concentration (or pH) and other operating conditions. As shown in FIG. 6B, the pre-treated biomass can be separated in a centrifuge 606 into a liquid component (C5 stream comprising primarily liquids with some solids) and a solids component (C6 stream comprising liquids and solids such as lignin and cellulose from which glucose can be made available by further treatment).

Figure 7:
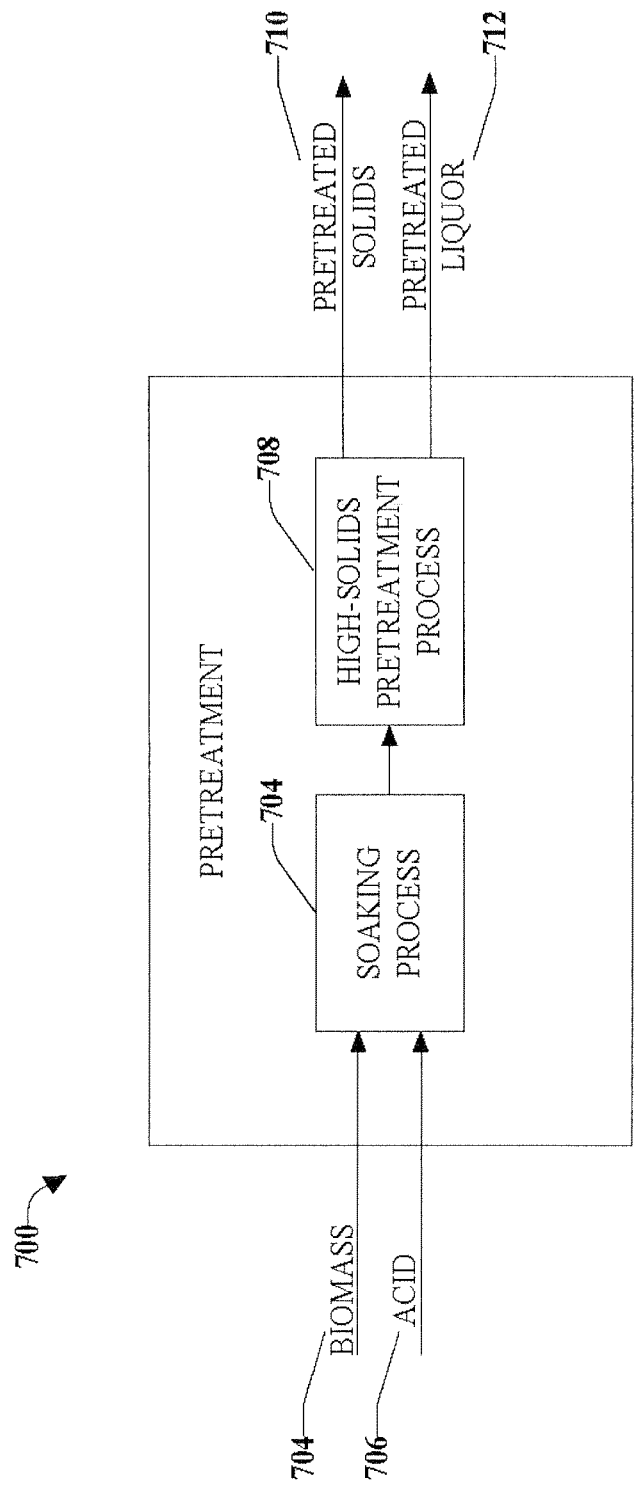
FIG. 7 illustrates a simplified schematic process flow diagram of a system for biomass pretreatment, according to an embodiment.

FIG. 7 illustrates a simplified schematic process flow diagram of a system 700 for biomass pretreatment, according to an embodiment. Included in system 700 is a soaking process 702, wherein biomass 704 and acid 706 are inputs to the soaking process 702. Also included in system 700 is a high-solids pretreatment process 708. Outputs of the high-solids pretreatment process 708 include pretreated solids 710 and pretreated liquor 712.

Figure 8:
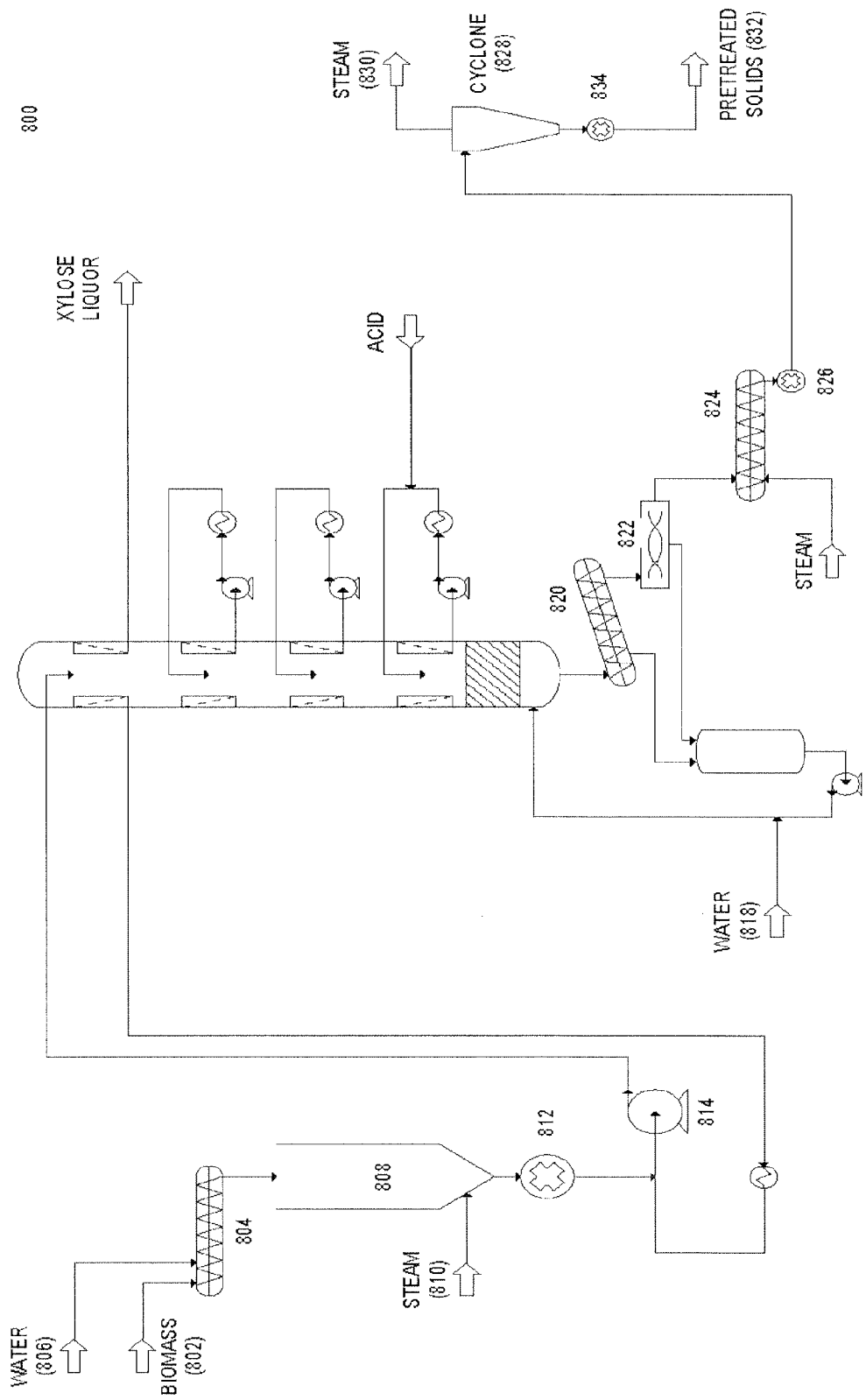
FIG. 8 is a schematic system block diagram of a system for biomass pretreatment, according to an embodiment.

FIG. 8 is a schematic system block diagram of a system 800 for biomass pretreatment, according to an embodiment. Biomass material 802 can be mixed (e.g., by a mixing screw 804) with water 806 to approximately 10% to 50% moisture and fed into a top of a steaming bin 808. Steam 810 can be introduced to the bottom of the steaming bin 808. The biomass can be heated to approximately 100 degrees Celsius. The air present in the biomass material can be displaced, which can allow for additional chemical impregnation in the downstream pretreatment processes.

In an embodiment, the pre-steamed biomass material can be fed into a reactor through a rotary valve 812 that provides pressure isolation. A centrifugal pump 814 can slurry the biomass material and transport the slurry to a top of a first stage vertical pretreatment reactor 816. The liquid can be utilized to slurry the biomass, which can be filtered through an integral screen in the reactor 816 before being returned to a feed pump, which was used to continuously slurry the biomass.

In accordance with an embodiment, the first stage pretreatment reactor 816 can be operated as a packed bed of solids with liquid circulating through the void spaces between the solid particles. The biomass material can be flowed in plug flow fashion down through the reactor until the biomass material reaches the bottom of the reactor. The total residence time of the biomass solids can in the range of approximately 2 hours to 10 hours, according to an embodiment. At the bottom of the reactor, the biomass material can be forced out of the reactor with water 818 and mechanical agitation. A draining screw 820 can be utilized to remove the bulk of the liquid from the solids. The partially de-watered solids can be fed into a plug screw feeder 822. Additionally, other known techniques of dewatering the solids may be utilized by some embodiments.

According to an embodiment, the plug screw feeder 822 can press the remaining solids to approximately 40 percent to 60 percent solids, of course, depending on the downstream application, the remaining solids may be greater than 60% or lower than 40%, as desirable. The plug screw feeder 822 can feed the biomass solids into a second stage pretreatment reactor 824. The second stage reactor can be a screw conveyor type reactor that heats the solid material from about 150 degrees Celsius to about 210 degrees Celsius with direct contact steam, in accordance with some embodiments. Higher temperatures may also be achieved, as desired. The second stage reactor can also hold the material from about one minute to about five minutes. An outlet of the second stage reactor can be discharged through a swept orifice discharger 826 and conveyed by the steam to an atmospheric collection cyclone 828 where the steam 830 can be vented to atmospheric pressure. The conveyance of the biomass material to the cyclone 828 can include pneumatic conveyance (e.g., blown) by steam, for example. The rapid pressure drop through the blow line can result in an explosion-like expansion of the biomass material that further opens up the structure for enzymatic attack. The pretreated solids 832 from the collection cyclone can be dropped into the enzymatic saccharification process through a rotary valve 834 for pressure isolation, according to some embodiments.

In accordance with some embodiments, liquid can be introduced into a first stage pretreatment reactor at the bottom, flowed counter-currently up through the bed of solids and exits the reactor near the top. The liquid from the draining screw and the plug screw feeder can be collected in a small surge tank and pumped back into the bottom of the reactor to force out the solids. Additional makeup water can be added to this water recycle loop. A portion of the water may exit the modified screw device as moisture from the biomass solids. However, most of the water may flow up through the bottom section of the first stage pretreatment reactor.

According to some embodiments, the counter-current flow of water can act as a displacement wash of the bed of biomass solids preventing most of the acid and soluble components from exiting with the solids. As the liquid flows up through the reactor, there may be several (about two through five, for example) liquid recirculation loops to promote mass transfer between the solid and the liquid phases. Each recirculation loop may consist of a screen that is integral to the outside shell of the reactor. Liquid exiting the reactor through the screen on the circumference of the reactor vessel wall can be pumped through a heat exchanger to control temperature before being injected near a center of the reactor in the same zone as the screen from which it was taken.

In accordance with some embodiments, an acid, such as concentrated sulfuric acid, for example, can be injected into the bottom liquid recirculation loop to control the acid concentration from about 0.5 to about 1.0% w/w. The acid solution can be moved up through the bed of biomass solids and hydrolyze the hemicellulose fraction of the biomass solids as it is moved. In this counter-current scheme, the fresh unhydrolyzed biomass entering the top of the reactor can be contacted with acid solution with a high concentration of dissolved hemicellulose fractions while the mostly hydrolyzed biomass at the bottom of the reactor can be contacted with fresh acid solution that can have an ability to hydrolyze the remaining hemicellulose fraction. The liquid solution can exit the system through a screen near the top of the reactor, according to some embodiments.

Figure 9:
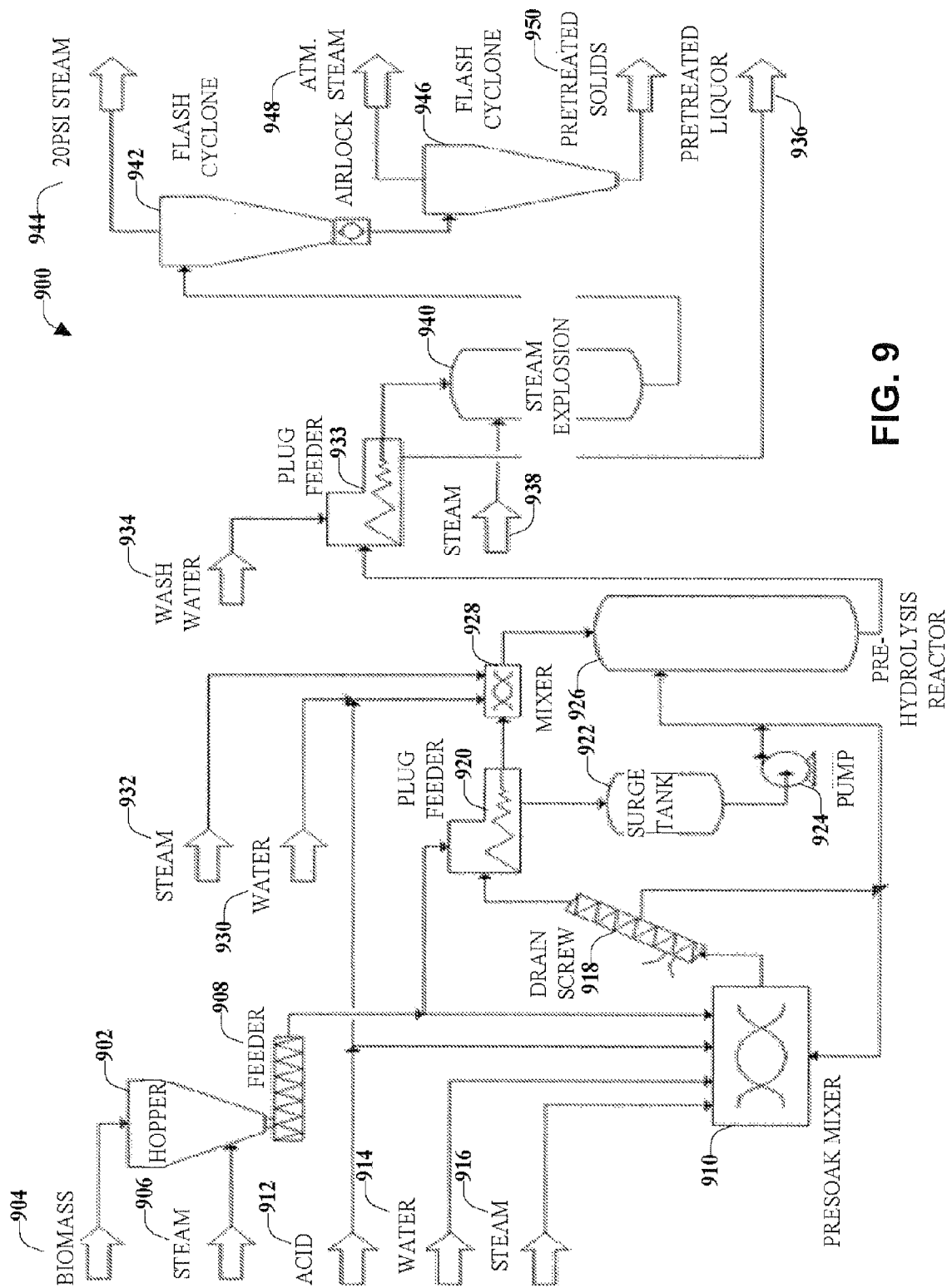
FIG. 9 is another schematic system block diagram of a system for biomass pretreatment, according to an embodiment.

FIG. 9 is a schematic system block diagram of a system 900 for biomass pretreatment, according to an embodiment. A soaking process is introduced at the beginning of a high solids pretreatment process in some embodiments of the pretreatment system. The soaking process can provide an increased pentose sugar production as compared to systems that do not utilize a soaking process.

System 900, according to some embodiments, includes a hopper 902 into which biomass 904 is fed. Steam 906 is applied to the biomass 904 and both are routed through a feeder 908 to a presoak mixer 910 where the biomass/steam mixture is further mixed with acid 912, water 914, and steam 916. The mixed biomass may then be output through a drain screw 918 to a plug feeder 920. A first portion of the material in the plug feeder 920 is output to a surge tank 922 and pumped 924 to a pre-hydrolysis reactor 926. A second portion of the material from the plug feeder 920 is mixed 928 with water 930 and steam 932 and fed into the pre-hydrolysis reactor 926.

The mixed material is output from the pre-hydrolysis reactor 926 into a plug feeder 933 into which wash water 934 is also fed. At least a portion of the material in the plug feeder 932 is used as pretreated liquor 936. A second portion of the material in the plug feeder 932 is combined with steam 938 to produce a steam explosion 940. After the steam explosion 940 a first flash cyclone 942 outputs steam 944 and a second flash cyclone 946 outputs atmospheric steam 948 and pretreated solids 950.

Figure 10:
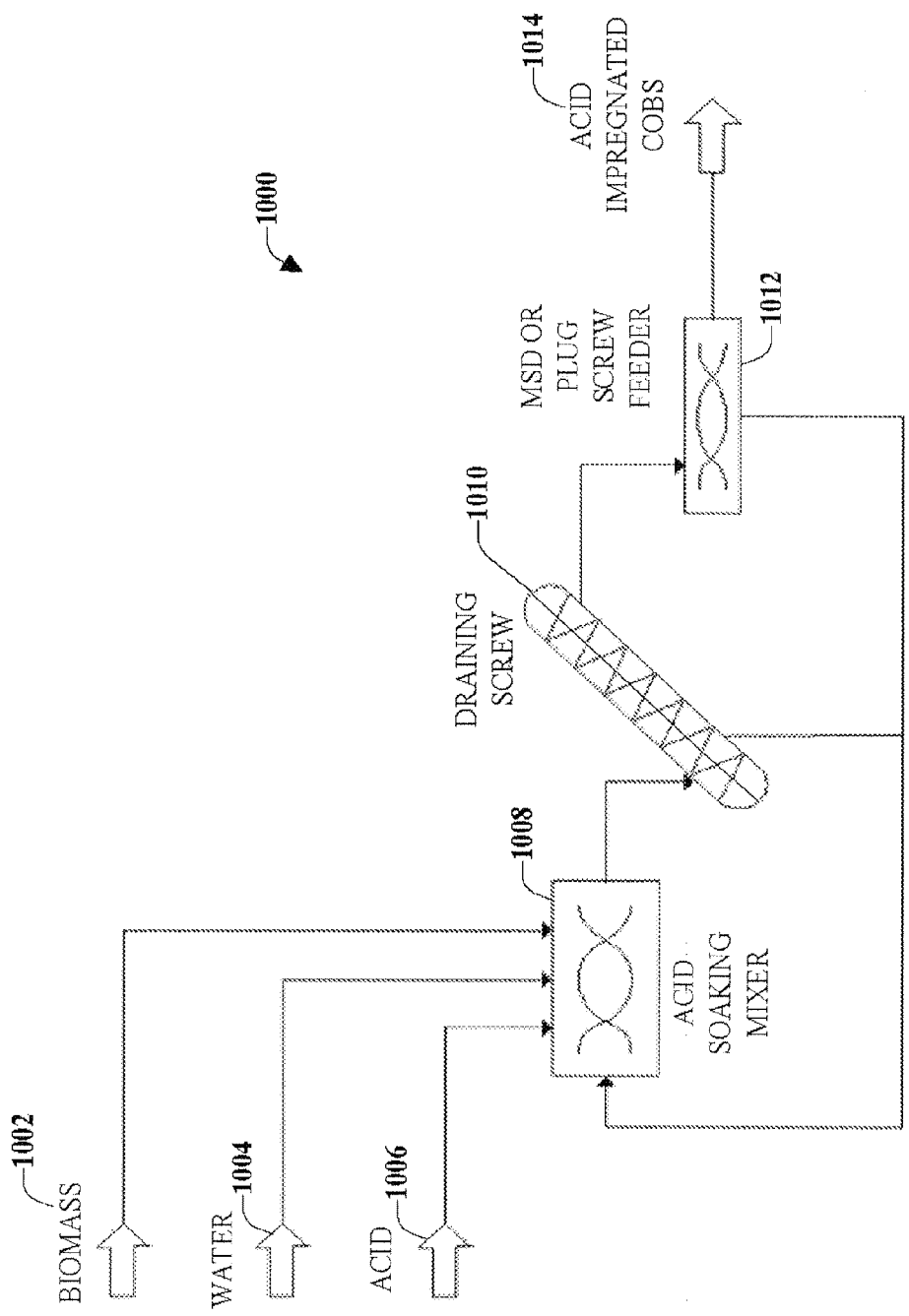
FIG. 10 illustrates a schematic system block diagram of the presoak process of a system for biomass pretreatment, according to an embodiment.

FIG. 10 illustrates a schematic system block diagram of the presoak process of a system 1000 for biomass pretreatment, according to an embodiment. As shown, biomass 1002, water 1004, and acid 1006 are input into an acid soaking mixer 1008. A draining screw 1010 can be configured to route a first portion of the mixed material to a plug screw feeder 1012 to produce acid impregnated cobs 1014, according to an embodiment. At least a portion of the output from the draining screw 1010 and plug screw feeder 1012 can be fed back (e.g., feedback loop) to the acid soaking mixer 1008.

Figure 11:
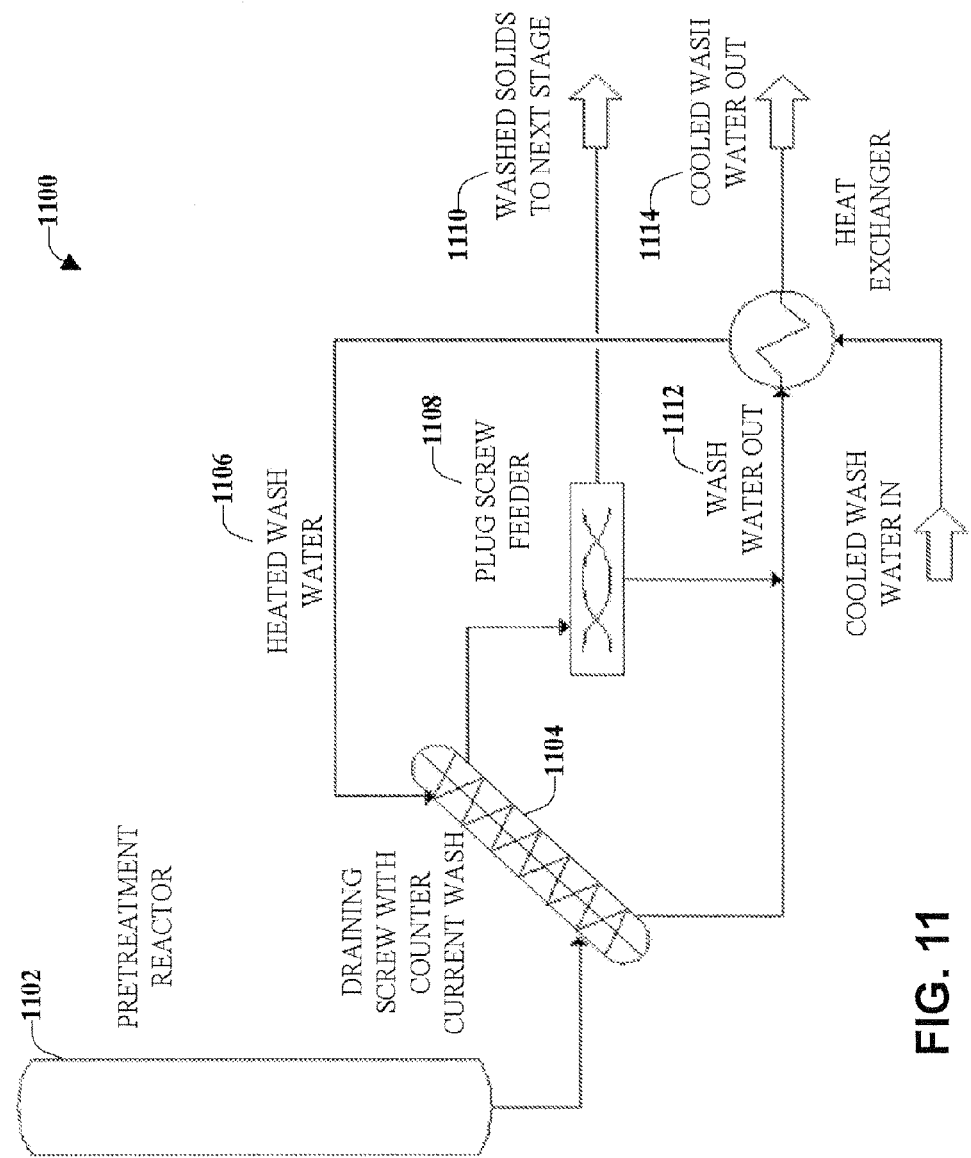
FIG. 11 illustrates a schematic system block diagram of a system for biomass pretreatment implementing a presoak process using a counter current washing method, according to an embodiment.

FIG. 11 illustrates a schematic system block diagram of a system 1100 for biomass pretreatment implementing a presoak process using a counter current washing method, according to an embodiment. In accordance with some embodiments, the wash can remove soluble sugars and oligomers to allow for a better hydrolysis process to make the conversion of oligomers into sugar through hydrolysis using either enzymes or acid.

The example system 1100 comprises a pretreatment reactor 1102 into which biomass is routed. The pretreated biomass can be output to a draining screw 1104 that can have a counter current wash. Heated wash water 1106 is also input into the draining screw. A first portion of the material is routed from the draining screw 1104 to a plug screw feeder 1108. At least a portion of the material input into the plug screw feeder 1108 (e.g., washed solids) is sent to a next stage 1110 for further treatment. Wash water 1112 from the plug screw feeder 1108 can be sent out as cooled wash water 1114.

Figure 12A:
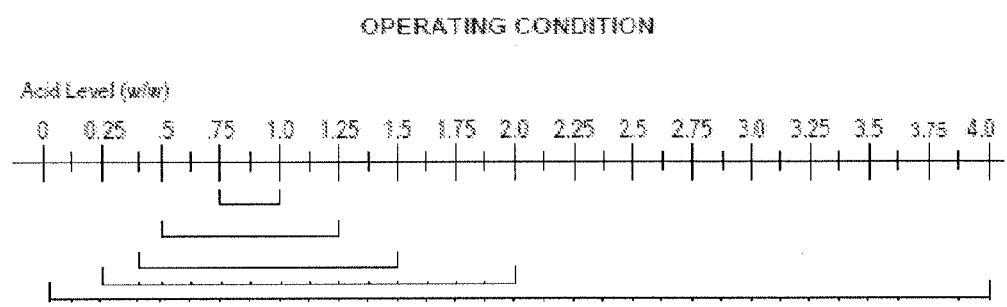
FIGS. 12A, 12B, 12C, 12D, 12E, and 12F show operating parameters for biomass pretreatment, according to an aspect.
Figure 12B:
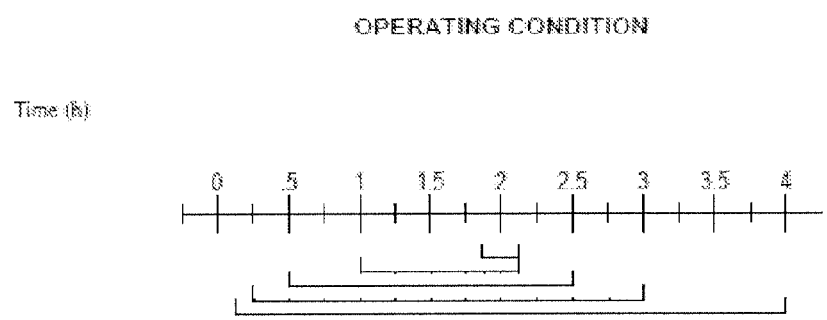
Figure 12C:
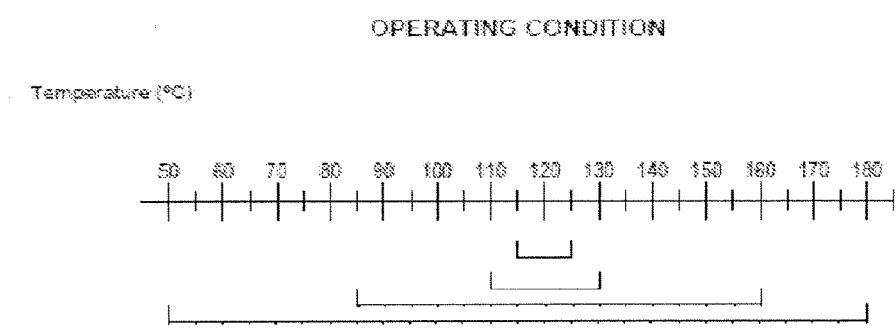
Figure 12D:
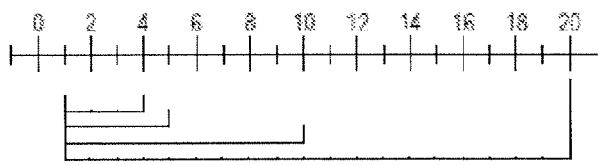
Figure 12E:
Figure 12F:
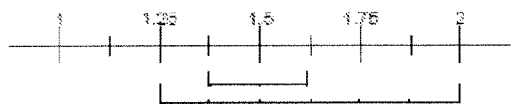

The operating conditions for subject conditions relating to the pretreatment system are shown in FIGS. 12A through 12C (first pretreatment reactor) and FIGS. 12D through 12F (second pretreatment reactor). Operating conditions for each subject condition can be indicated as "nested" ranges, comprising an acceptable operating range (the outer/wide range shown), and more specific exemplary operating ranges.

As shown in FIG. 12A, the steeping process (first pretreatment reactor) can be conducted at various acid levels. In an embodiment, the steeping process can be conducted at an acid level from about 0.1% w/w to about 4.0% w/w. In another embodiment, the steeping process can be conducted at an acid level of from about 0.25% w/w to about 2.0% w/w. In another embodiment, the steeping process can be conducted from at an acid level of from about 0.4% w/w to about 1.55% w/w. In an embodiment, the steeping process can be conducted at an acid level of from about 0.5% w/w to about 1.25% w/w. In yet another embodiment, the steeping process can be conducted at an acid level of from about 0.75% w/w to about 1.0% w/w.

As shown in FIG. 12B, the steeping process (first pretreatment reactor) can be carried out for varying amounts of time. In an embodiment, the steeping process can be conducted for a time period of from about 10 minutes to about 4 hours. In another embodiment, the steeping process can be conducted for a time period of from about 20 minutes to about 3 hours. In another embodiment, the steeping process can be conducted for a time period of from about 30 minutes to about 2.5 hours. In yet another embodiment, the steeping process can be conducted for a time period of from about 1 hour to about 2.5 hours. In a particular embodiment, the steeping process can be conducted for a time period of about 2 hours.

As shown in FIG. 12C, the steeping process (first pretreatment reactor) can be carried out at various temperatures. In an embodiment, the steeping process can be conducted at a temperature range of from about 50 degree Celsius to about 180 degree Celsius. In another embodiment, the steeping process can be conducted at a temperature of from about 90 degrees Celsius to about 160 degrees Celsius. In another embodiment, the steeping process can be conducted at a temperature of from about 110 degrees Celsius to about 130 degrees Celsius. In yet another embodiment, the steeping process can be conducted at a temperature of about 120 degrees Celsius.

As shown in FIG. 12D, the steeping process (second pretreatment reactor) can be carried out for varying amounts of time. In an embodiment, the steeping process can be conducted for a time period of from about 1 minute to about 20 minutes. In another embodiment, the steeping process can be conducted for a time period of from about 1 minute to about 10 minutes. In another embodiment, the steeping process can be conducted for a time period of from about 1 minute to about 5 minutes. In yet another embodiment, the steeping process can be conducted for a time period of about 1 minute to 4 minutes.

As shown in FIG. 12E, the steeping process (second pretreatment reactor) can be carried out at various temperatures. In an embodiment, the steeping process can be conducted at a temperature range of from about 140 degree Celsius to about 210 degree Celsius. In another embodiment, the steeping process can be conducted at a temperature of from about 150 degrees Celsius to about 180 degrees Celsius. In yet another embodiment, the steeping process can be conducted at a temperature of about 150 degrees Celsius to 160 degrees Celsius.

As shown in FIG. 12F, the steeping process (second pretreatment reactor) can be carried out at various pH levels. In an embodiment, the steeping process can be conducted at a pH range of from about 1.3 to 2.0 pH. In another embodiment, the steeping process can be conducted at a pH level of about 1.5.

\* \* \*

A series of limited examples were conducted according to an exemplary embodiment of the system (as shown in FIGS. 7-11 and 13) in an effort to determine suitable apparatus and operating conditions for the separation of pre-treated biomass. Data from the examples is shown in FIGS. 14 through 25 and TABLES 4 through 6.

EXAMPLE 1

A biomass pretreatment system was used in Example 1 to test the efficacy of a high solids pretreatment process without a soaking process. Example 1 sought to identify the time, temperature, and acid level needed to maximize the pentose sugar released during pretreatment. Corn cob solids were used as the biomass for testing. The corn cob solids contained between approximately 5 to 20 percent moisture. Although a maximum moisture level of about 20 percent was used for Example 1, the moisture level could be higher since the biomass (e.g., corn cob solids) can be stored outside in an unprotected manner and exposed to moisture (e.g., rain, snow). The solids level was controlled in Example 1 by accounting for the moisture in the corn cob solids and by adjusting the amount of water added in order to adjust the overall solids content of the slurry in the process. Sulfuric acid was added to the slurry to achieve a concentration of acid in the slurry of between approximately 0.5 percent and 0.9 percent. The temperate was adjusted from between about 150 and 190 degrees Celsius and for a constant time of 10 minutes. The corn cob solids were varied at between about 30 and 40 percent solids on a dry weight basis.

Figure 13:
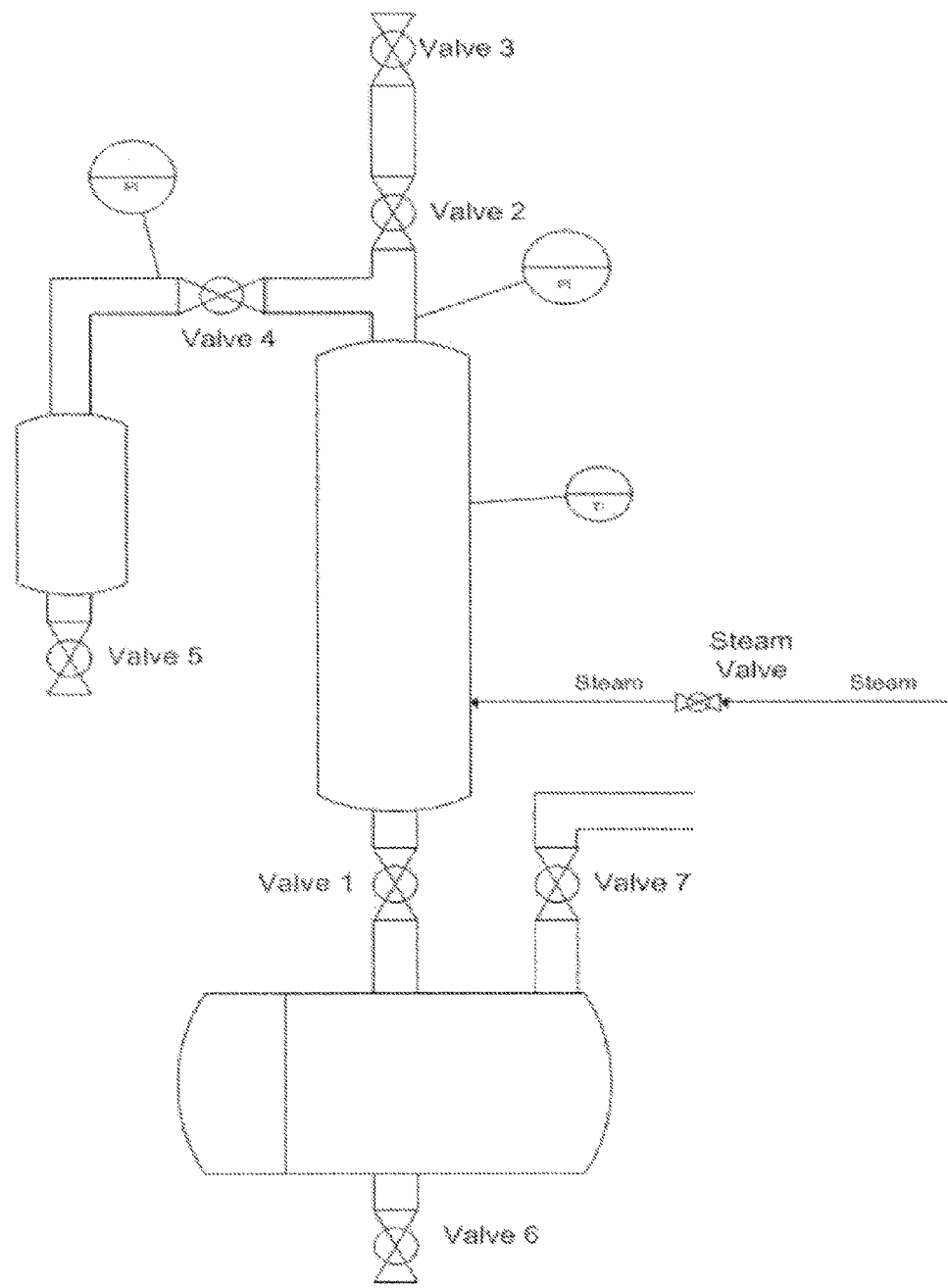
FIG. 13 shows a schematic representation of a high solids reactor, according to an embodiment.

Samples for Example 1 were prepared, as shown in the parameters listed in Table 4, prior to being loaded into a lab scale high solids reactor (or steam gun reactor), illustrated in FIG. 13. Each of the samples were loaded into the steam gun reactor and heated up to (and held at) a set temperature (see Table 4) for 10 minutes. After 10 minutes, the bottom valve of the steam gun was rapidly opened to "explode" the material. Steam was applied to the bottom of the reactor to heat the sample and hold the sample at a set temperature (see Table 4). A high temperature heat tape was wrapped around the reactor body to insulate the reactor and help minimize heat loss. The body of the reactor was also covered with insulation to further minimize heat loss.

Figure 14:
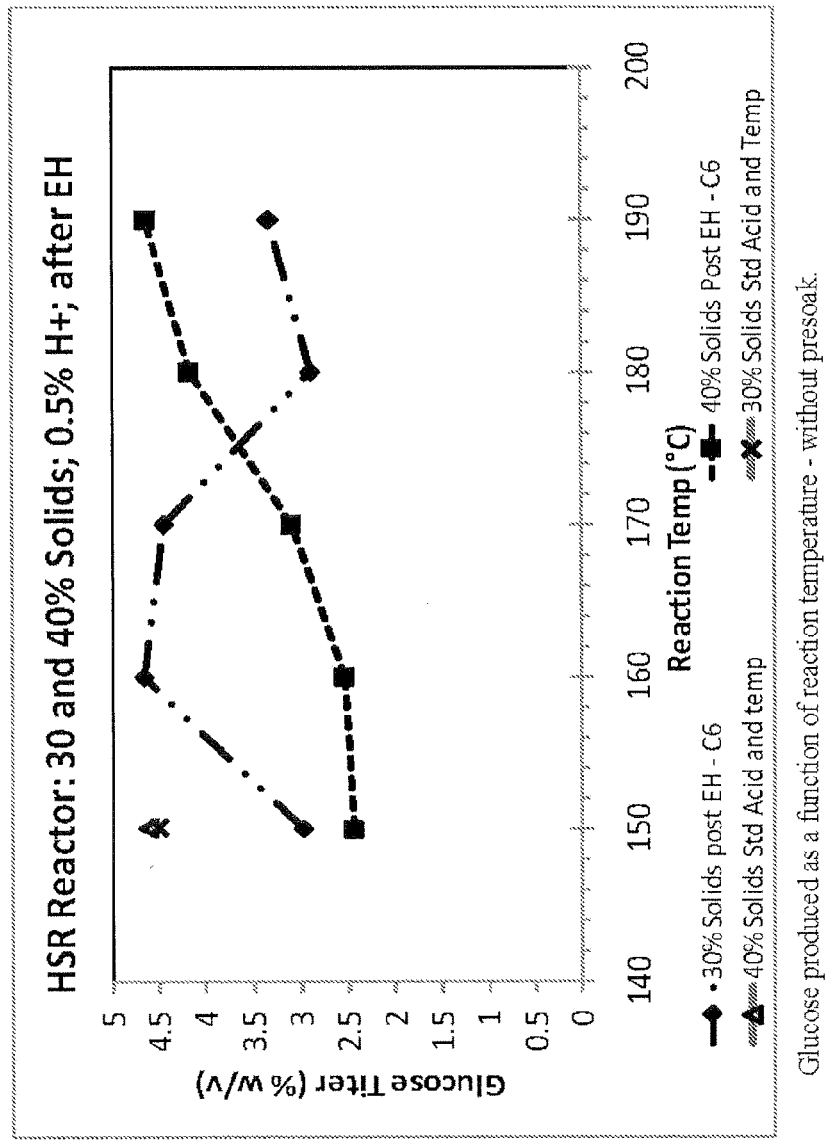
FIG. 14 shows glucose levels in saccharified samples, plotted as a function of reaction temperature.
Figure 15:
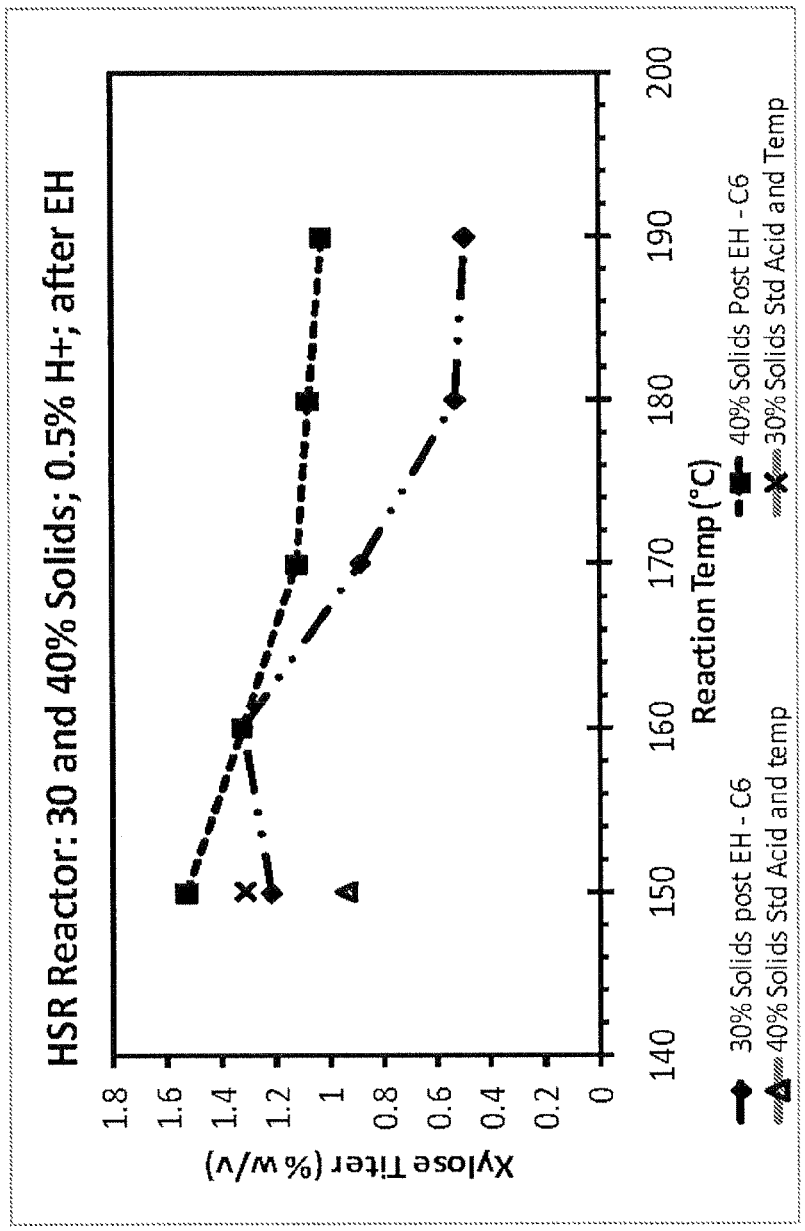
FIG. 15 shows xylose levels in saccharified samples, plotted as a function of reaction temperature.

Samples treated in the steam gun reactor were saccharified (e.g., processed with enzyme hydrolysis) and the resultant sugar levels were recorded. The saccharification was performed according to standard operating procedures for biomass saccharification, established by POET, LLC. of Sioux Falls, S.Dak.. It was expected that the xylose produced would be at least 3 percent. However, it was observed that the obtained xylose produced was 0.4 to 1.6 percent by weight/volume. It was also observed that pretreatment in the high solids reactor alone was not sufficient to break down the xylan or hemicellulose to sugar and that the enzyme systems were not sufficient to break down the xylan to sugar. The results are shown in FIGS. 14 and 15.

To address the issue observed in Example 1, a soaking process (e.g., steeping process) was developed, as disclosed herein, to improve penetration of the acid in the biomass and to provide an environment that might begin the hydrolysis of the xylan to pentose sugar (e.g. xylose).

EXAMPLES 2 THROUGH 7

Examples 2 through 7 were conducted to test the efficacy of a high solids pretreatment process with a soaking process (e.g., steeping process). TABLE 5 shows parameters of the experimental design for Examples 2 through 7. Time, temperature, and acid levels were modified to determine an optimal acid steeping process. In Examples 2 through 7, corn cobs were obtained from Cedar Hill Enterprises, Vernon Flamme, of North Bend, Nebr. The cobs were stored in a Quonset but style building to maintain a dry environment with minimal or no exposure to sun and inclement weather. The cobs were ground in a hammer mill or in a Henke mill. The hammer mill provided a course flour and the Henke mill provided cob pieces approximately 1 inch long. The ground cobs were soaked in acid using a 1 L centrifuge bottle in a water bath set at the desired temperature (see Table 5). The higher temperatures were achieved using Parr reactors and high pressure steam to heat the Parr reactors. The steeped material was separated by lab centrifuge to allow for separate analysis of the liquids and solids.

Examples 2 through 7 are small-scale steeping experiments performed in a Parr reactor, a stainless steel vessel that utilizes a collar clamp to hold the vessel closed and sealed against an o-ring seal. The vessel base was removed from the lid that houses the stirrer and several ports with valves and the cooling loop inlets. The reactor was loaded by pouring 100 g of the ground cobs into the vessel bottom, adding the appropriate volume (600 mL) or mass of dilute sulfuric acid, and stirring with a spatula to initially wet the dry cob sample, allowing the sample to be stirred. The vessel was closed and sealed by tightening the clamps. Once all valves were closed, the steam was applied to the reactor through its external jacket using appropriate fittings. The temperature was monitored with a temperature probe in the thermo-well of the vessel. After cooling to below 80 degrees Celsius, hydrolyzate liquid (liquor) was separated from the solids using a centrifuge. The contents were poured into a 1 L centrifuge bottle and centrifuged at 4000 rpm for 10 minutes. The supernatant liquor was poured off of the solids and sampled into a 15 mL tube for analysis. This liquor was filtered using a 25 μm filter paper prior to ion exchange chromatography. Larger scale steeping reactions can be performed in a similar manner, using a 50-liter stirred tank reactor. Similar conditions can be used for steeping, with the mass to volume ratios kept constant. Separation was performed using a screw press. The resulting liquor was analyzed for sugar and inhibitor (HMF, Furfural) content by Ion Chromatography and High Performance Liquid Chromatography.

EXAMPLE 2

Figure 16:
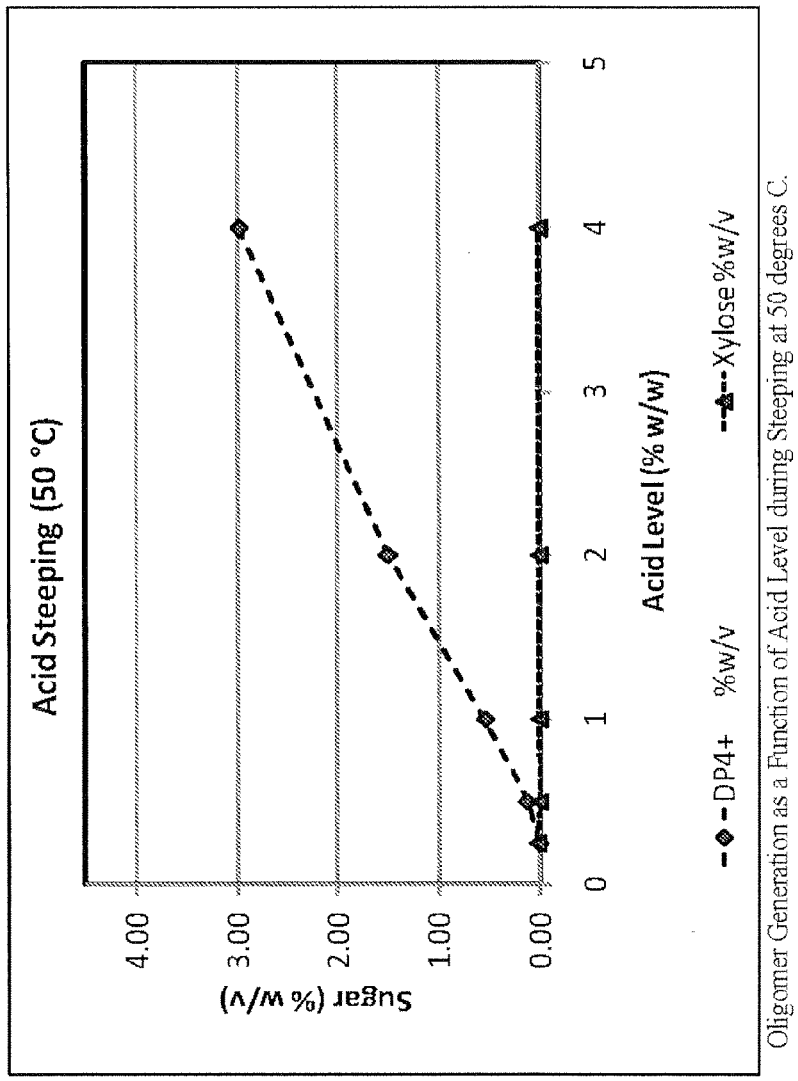
FIGS. 16, 17, and 18 are graphs showing the concentration of oligomers increasing as a function of acid level at different steeping temperatures.
Figure 17:
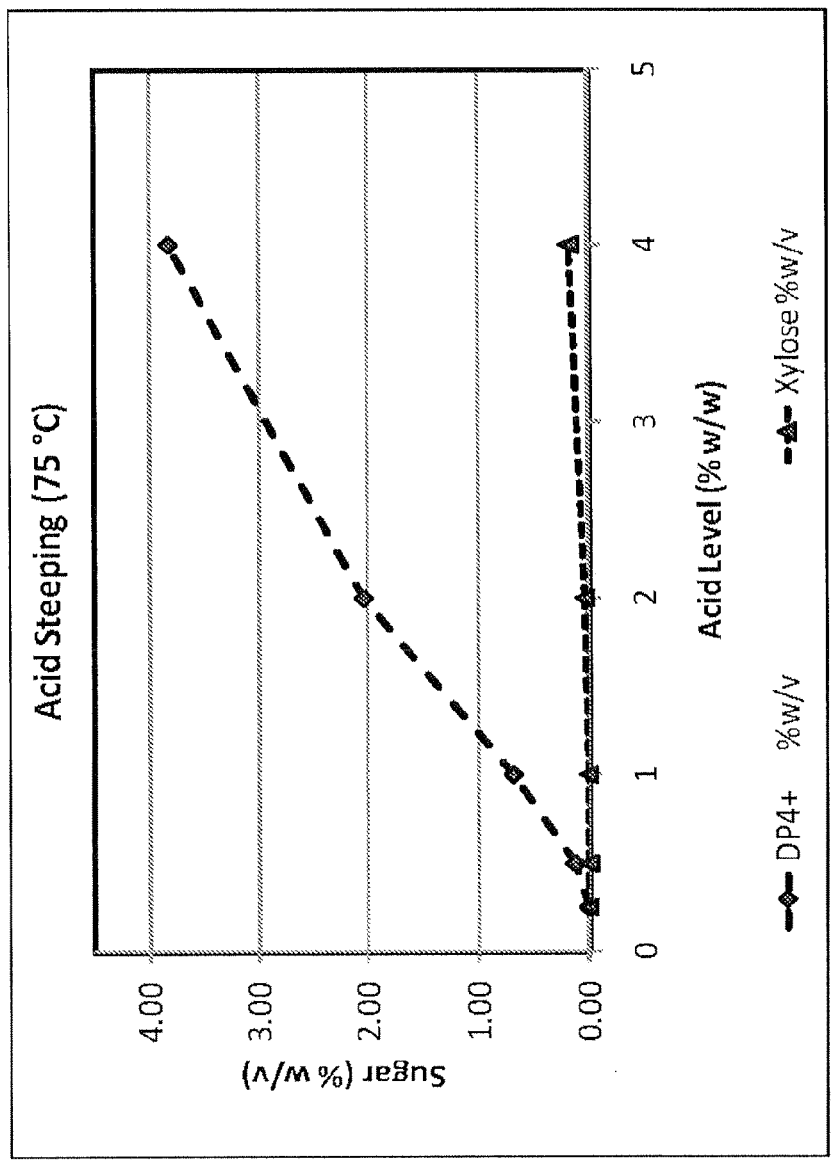
Figure 18:
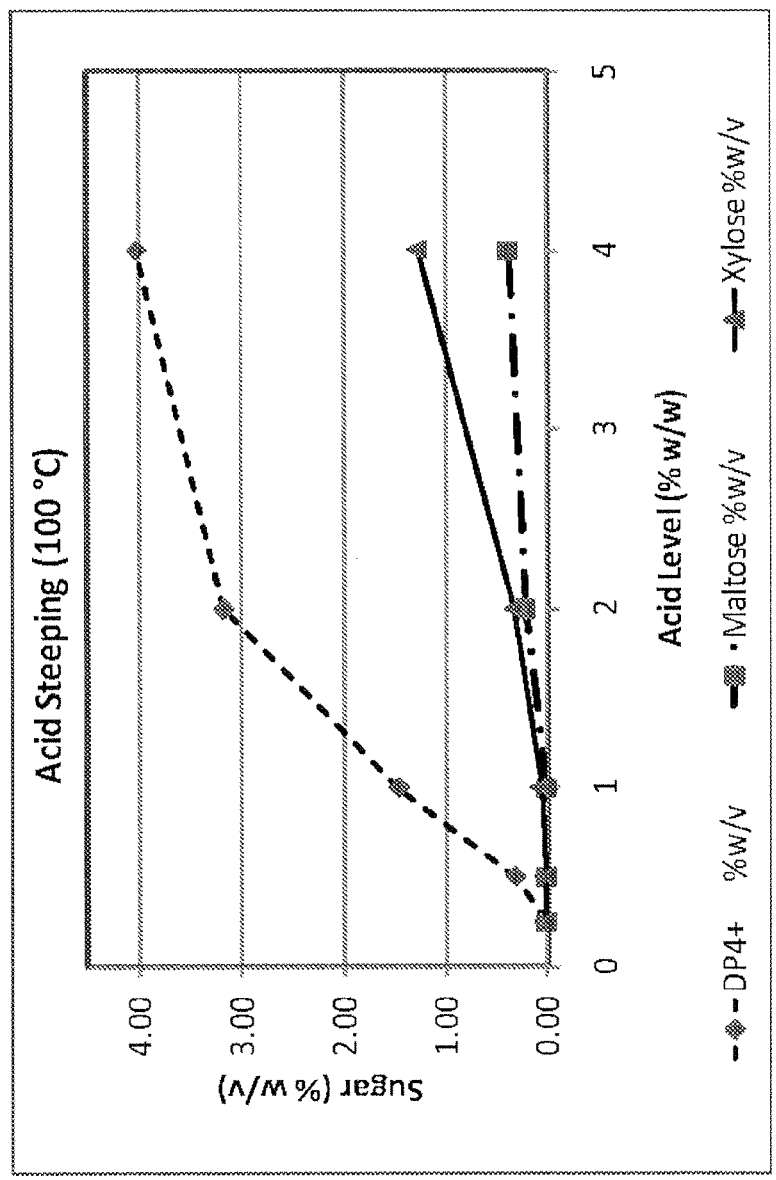

The biomass pretreatment system was used in Example 2 to evaluate the amount of acid needed to extract or hydrolyze the hemicellulose as xylo-oligomers and xylose. The steep liquid or liquor was removed from the steeped cobs by draining or by centrifugation. The steep liquor was analyzed for free pentose sugar and pentose oligomers (DP4+). The notation of DP4+ indicates a degree of polymerization of at least 4 to make a significant oligomer molecule. It was observed that increasing acid concentration increases free oligomer levels. The steeping process was conducted at several different steeping temperatures, including 50 degrees Celsius (FIG. 16), 75 degrees Celsius (FIG. 17), and 100 degrees Celsius (FIG. 18) for a period of 10 minutes. It was also observed that the use of 4% acid hydrolyzed more hemicellulose than did 0.25% acid at a given temperature. The maltose labeled line (FIG. 18) is an indication of smaller xylose oligomers that may have degrees of polymerization of 2 or 3. It was also observed that the elevated temperature produced free pentose sugar at higher acid loadings. The results are shown in FIGS. 16, 17, and 18.

EXAMPLE 3

Figure 19:
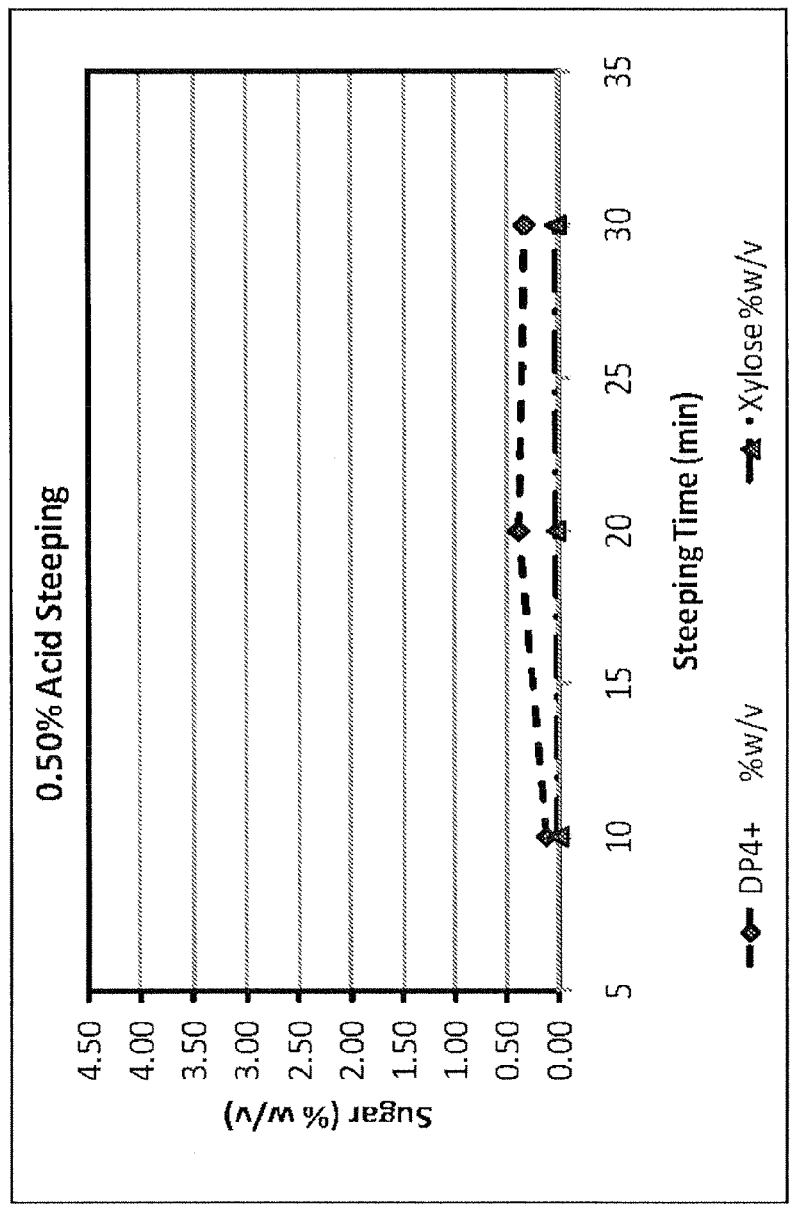
FIGS. 19 and 20 are graphs showing the level of oligomeric sugars (DP4+) released from corn cobs.
Figure 20:
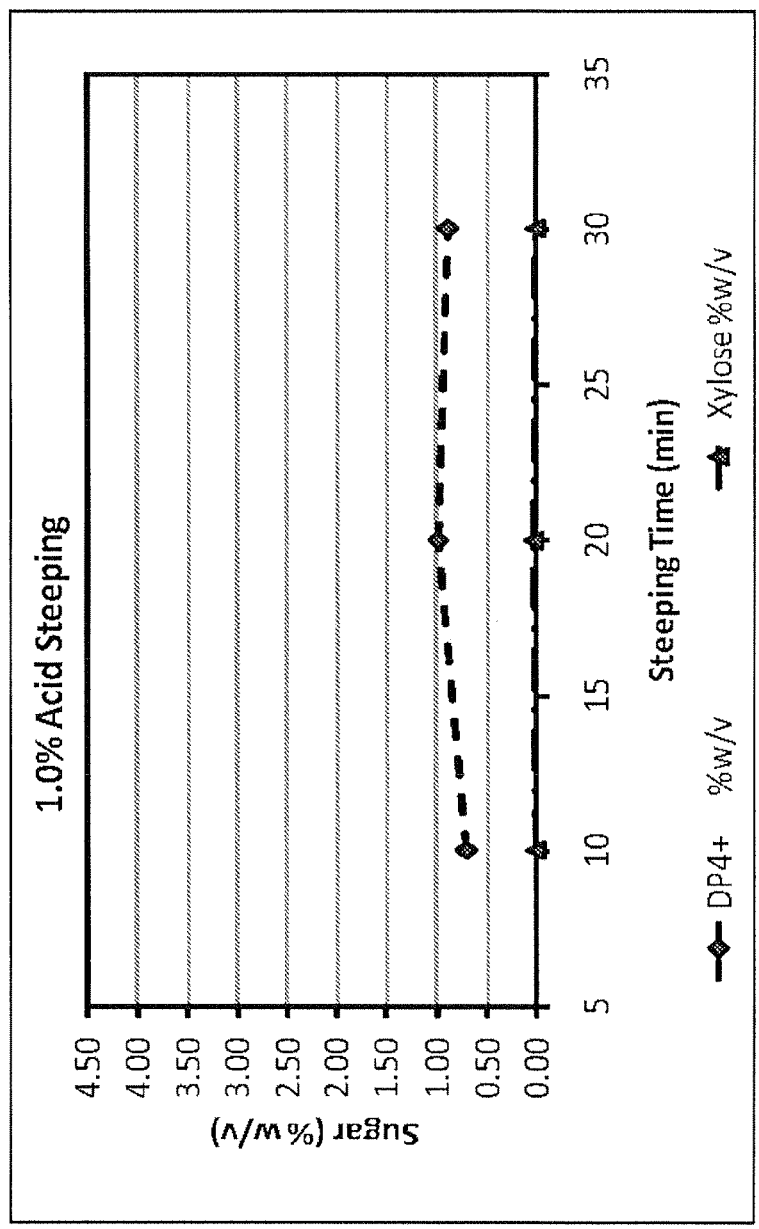
Figure 21:
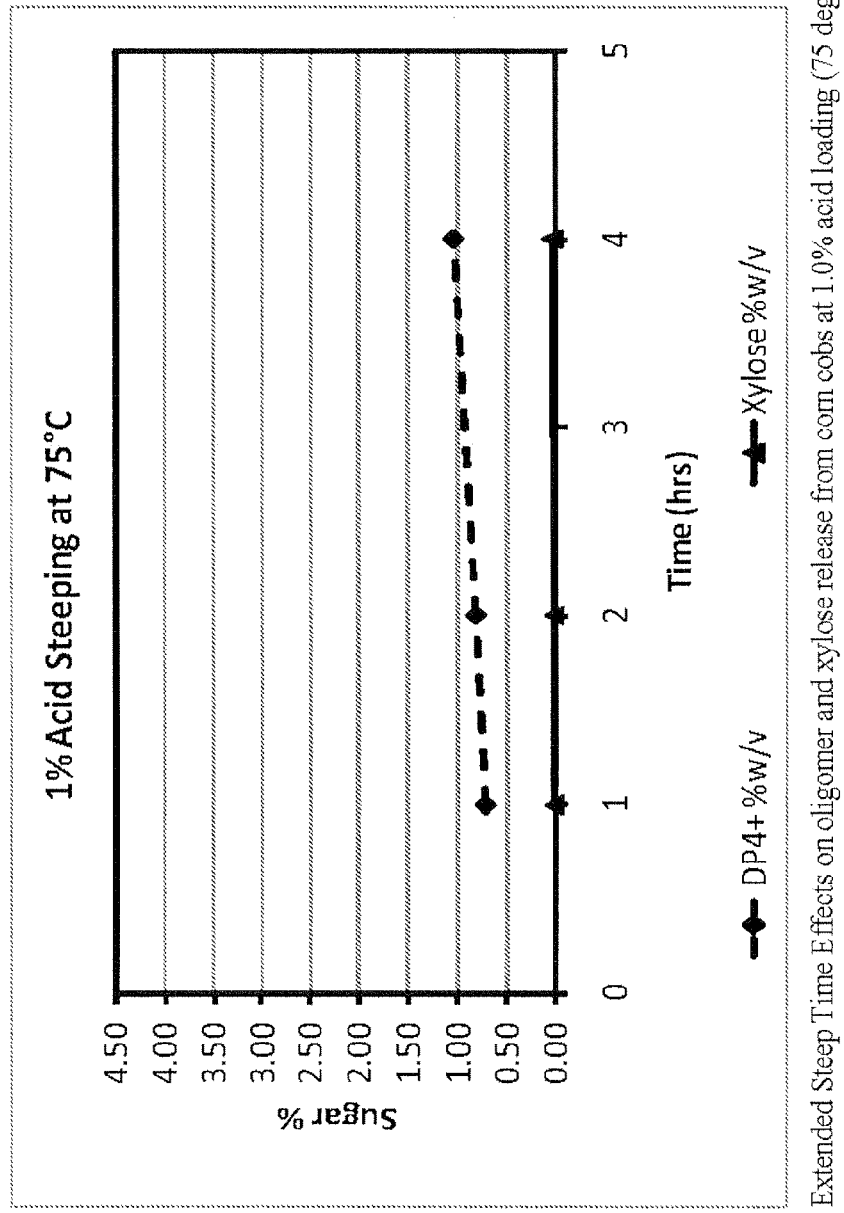
FIG. 21 is a graph showing extended steeping time effects on xylose and xylo-oligomer release.

The biomass pretreatment system was used in Example 3 to evaluate the steeping time on the sugar level at various acid levels. FIG. 19 is a graph showing the level of oligomeric sugars (DP4+) released from corn cobs at an acid level of 0.50% and a temperature of 75 degrees Celsius as a function of steeping time in minutes. FIG. 20 is a graph showing the level of oligomeric sugars (DP4+) released from corn cobs at an acid level of 1.0% and a temperature of 75 degrees Celsius as a function of steeping time in minutes. The time study was extended from 30 minutes to 4 hours and no significant gains. It was observed that longer times do not lead to increased xylo-oligomer release or to a significant hydrolysis to xylose. The results are shown in FIGS. 19, 20, and 21.

EXAMPLE 4

Figure 22:
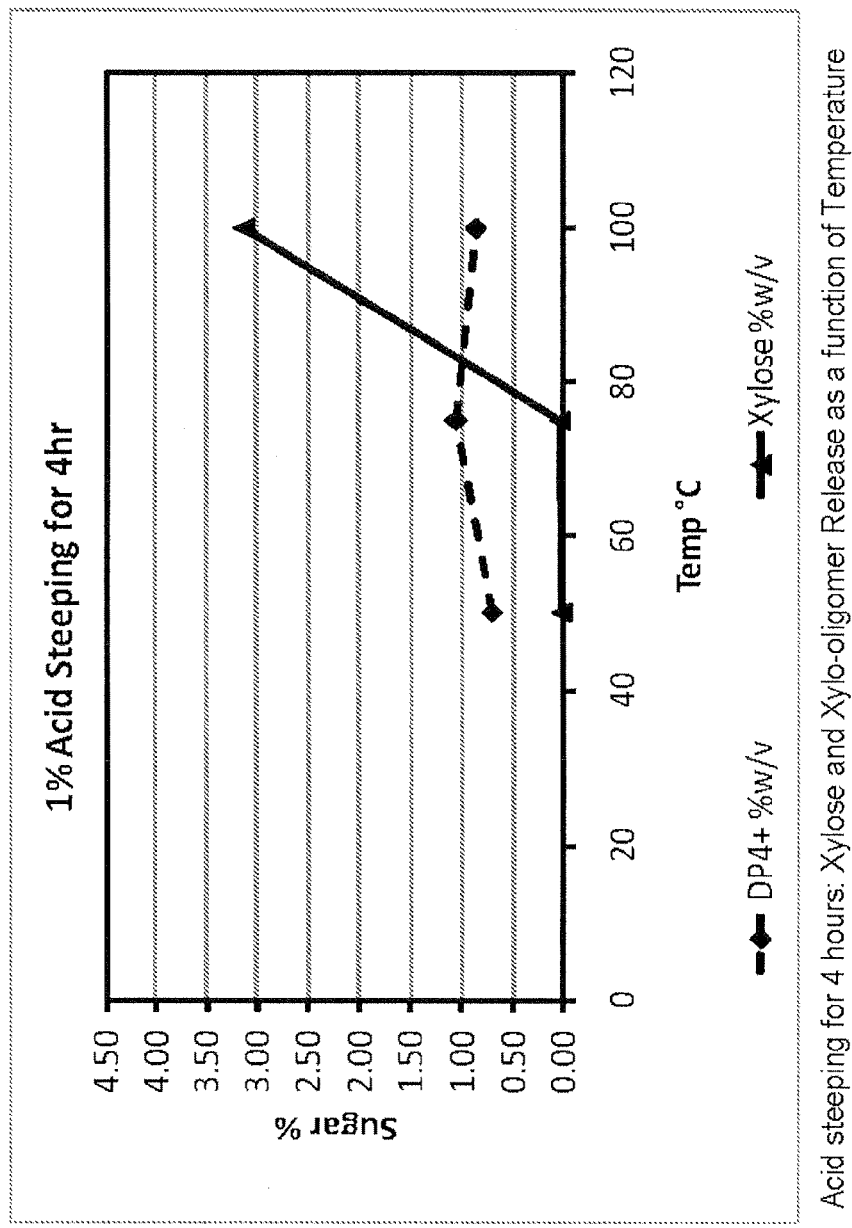
FIG. 22 is a graph showing the temperature effects on oligomeric sugars (DP4+) as a function of different temperatures for a steeping period of four hours.

The biomass pretreatment system was used in Example 4 to evaluate the temperature effects on xylo-oligomer and xylose release. An acid concentration of 1% and steeping temperatures of 50, 75, and 100 degrees Celsius were used to evaluate the effect of varying temperatures. It was observed that xylo-oligomer line (DP4+) peaked at about 75 degrees Celsius. It was also observed that the xylose sugar concentration increased sharply, indicating conversion of oligomer to xylose monomer. It was also observed that oligomer concentration decreased toward zero percent and xylose monomer content increased as the temperature increased to about 150 degrees Celsius. The xylose and xylo-oligomer yield was approximately 90%. The results are shown in FIG. 22.

EXAMPLE 5

Figure 23:
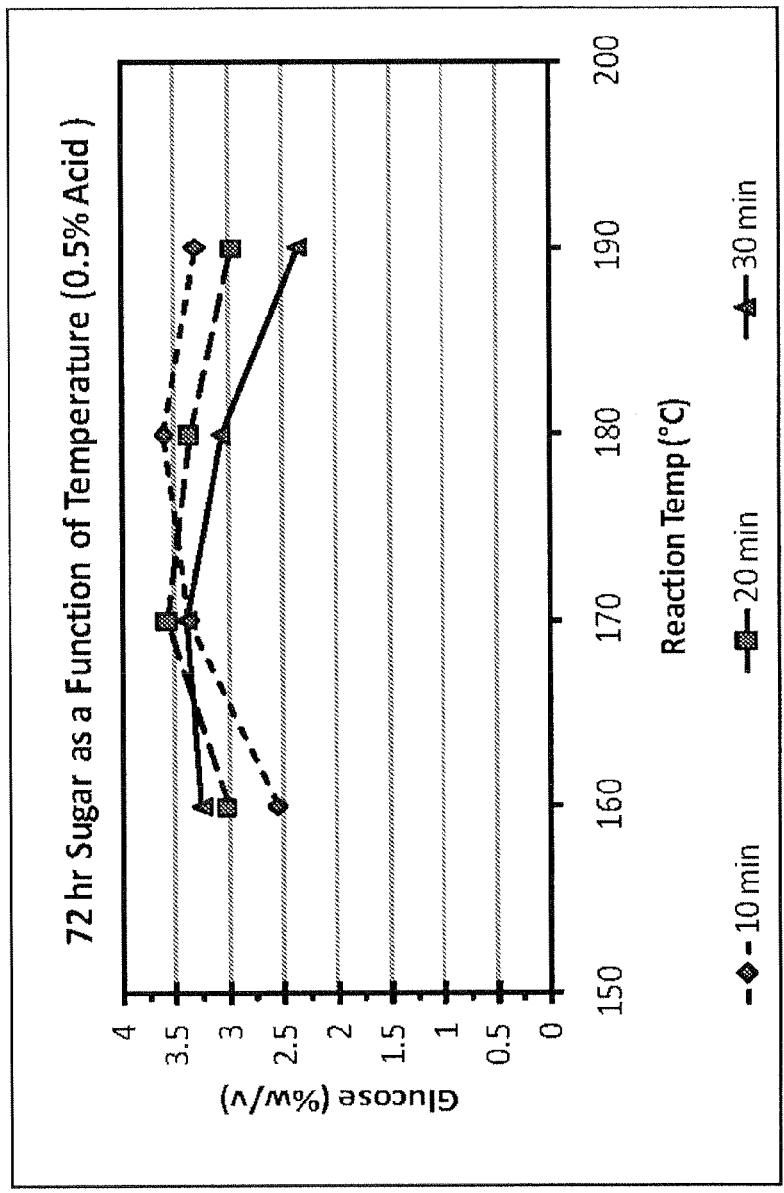
FIG. 23 is a graph showing glucose production of the steeping process (e.g., acid steeping or soaking process) at ambient temperature.
Figure 24:
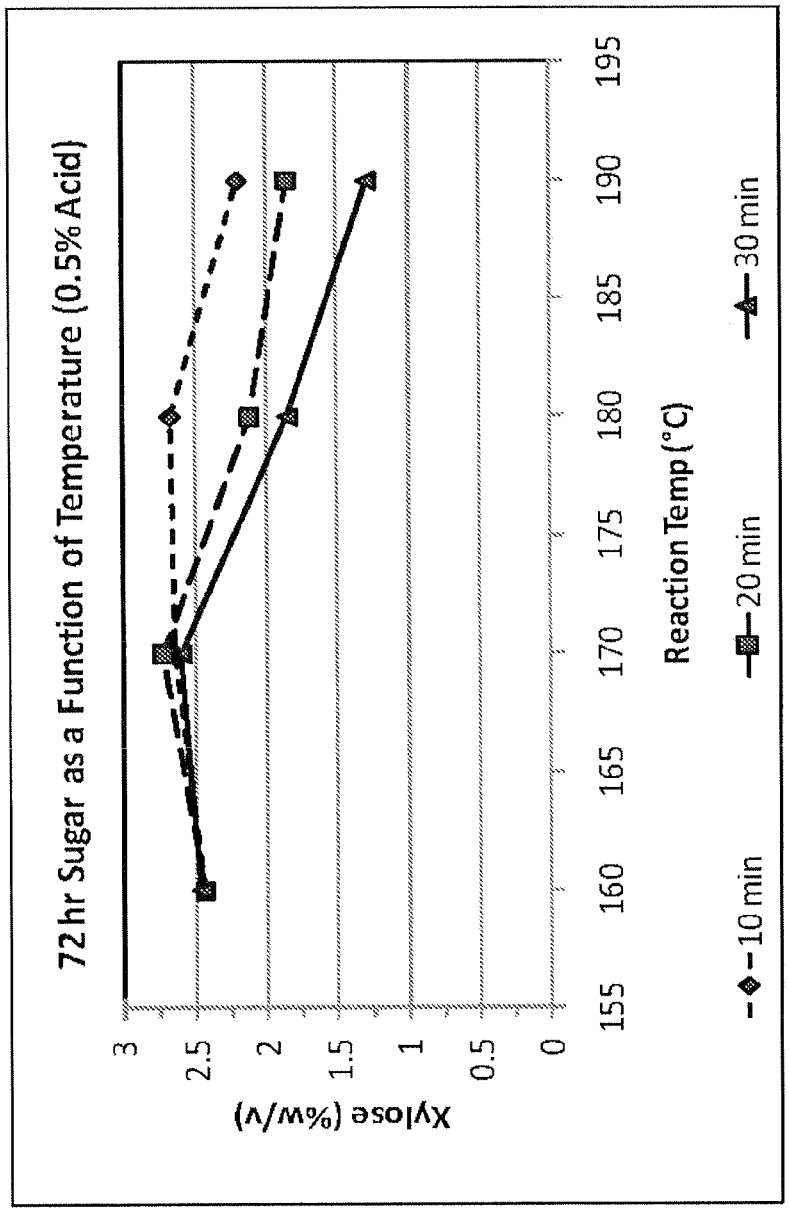
FIG. 24 is a graphs showing production of xylose under ambient steeping conditions.

The biomass pretreatment system was used in Example 5 to evaluate sugar production of the steeping process (e.g., acid steeping or soaking process) at ambient temperature. It was observed that the steeping process at ambient temperature provided increased xylose production (and, in some cases, nearly doubled xylose production compared to ambient temperature without soaking) even though no measureable oligomers were generated. It was also observed that the penetration of acid into the cob material was important to this increase in xylose production. The results are shown in FIGS. 23 and 24.

EXAMPLE 6

The biomass pretreatment system was used in Example 6 to evaluate the saccharification of glucan. A solid glucan fraction underwent a saccharification process set at pH 5.5, 50 degrees Celsius, and 10% solids. TABLE 6 shows the pretreatment conditions, enzyme loading (estimated enzyme loading if compositional data is not released), and estimated glucose yield from saccharification of acid steeped glucan solids. It was observed that glucose is released better from the materials treated with higher acid levels and the moderate temperatures of 100 degrees Celsius. Lower temperatures did not appear to provide the catalyst activation required to make the cellulose accessible to enzyme or convert hemicellulose or xylan to xylose. Reaction times of 4 hours at 100 degrees Celsius appear to be too long as both glucose and xylose yields seem to be reduced. It is possible that a fraction of the glucose was converted to hydroxymethylfurfural or HMF and that some of the xylose was converted to furfural.

EXAMPLE 7

Figure 25:
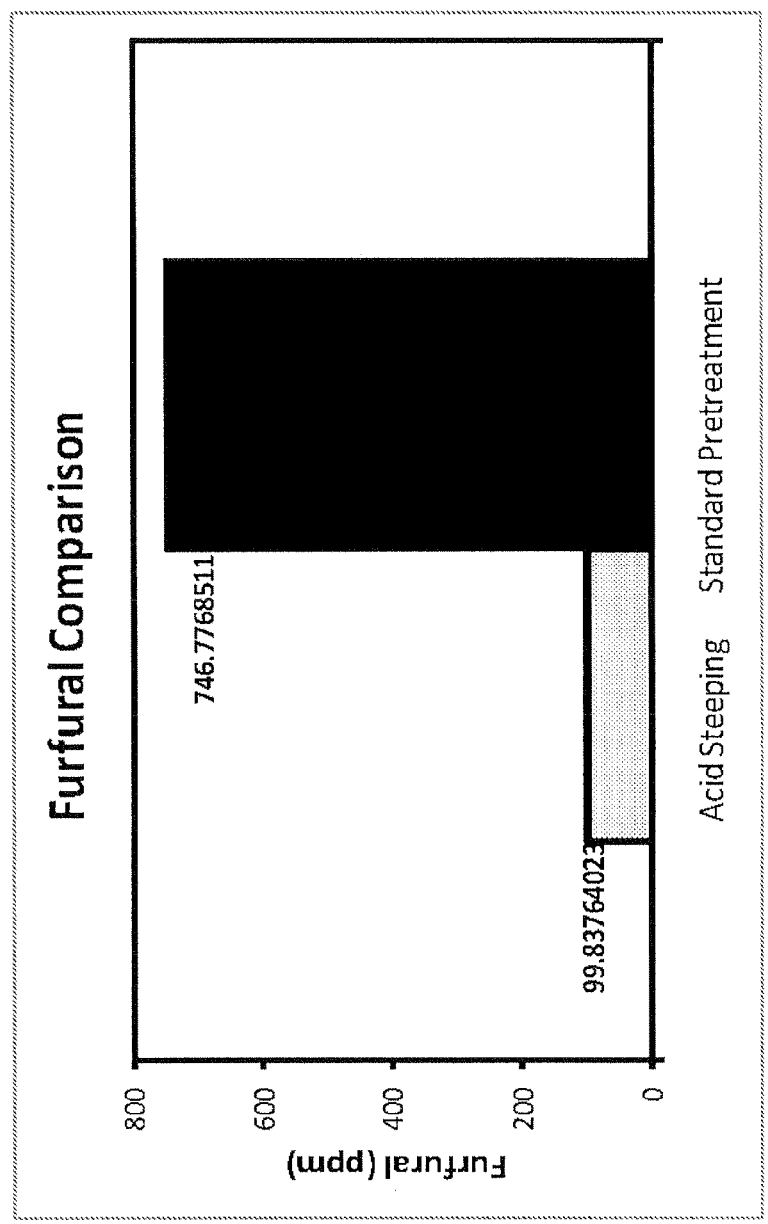
FIG. 25 is a bar graph comparing the level of furfural formed in an example steeping process with the level of furfural formed in the absence of a steeping process.

The biomass pretreatment system was used in Example 7 to evaluate the presence of inhibitors in the xylose liquor solutions. The formation of furfural is an indicator of inhibitor content. High furfural loadings indicate high amounts of inhibitors also extracted from the lignin. It was observed that both HMF and furfural were significantly lower in this process compared to a higher temperature process typically used. Typically, the furfural level is well over 1000 ppm and HMF levels are around 500 ppm compared to the levels of just under 800 ppm furfural and about 100 ppm HMF. The results are shown in FIG. 25.

\* \* \*

The embodiments as disclosed and described in the application (including the FIGURES and Examples) are intended to be illustrative and explanatory of the present invention. Modifications and variations of the disclosed embodiments, for example, of the apparatus and processes employed (or to be employed) as well as of the compositions and treatments used (or to be used), are possible; all such modifications and variations are intended to be within the scope of the present invention.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

What is claimed is:

1. A method for pre-treating biomass, comprising:
   steaming biomass in a steaming bin;
   processing the steamed biomass in a first pressurized pretreatment reactor which contains the biomass, acid and liquids, wherein the process disperses sugars in the biomass to the liquids, wherein the processing of the steamed biomass is performed under pressure in the first pretreatment reactor
   removing at least some portion of the liquids with the sugars from the processed biomass to generate substantial solids;
   feeding the substantial solids to a second pressurized pretreatment reactor while maintaining the substantial solids under pressure from the first pretreatment reactor to the second pressurized pretreatment reactor;
   processing the substantial solids in the second pretreatment reactor at a pH level in a range of 1.3 to 2.0 pH and under pressure;
   applying a rapid pressure drop to the substantial solids in the second pretreatment reactor or as the processed biomass flows from the second pretreatment reactor, wherein the rapid pressure drop opens up a cellulosic structure of the substantial solids; and
   sending the substantial solids with opened cellulosic structure to at least one of a saccharification process and a fermentation process for ethanol processing.

2. The method of claim 1, wherein the removing comprises releasing a maximum amount of pentose sugar from the steamed biomass.

3. The method of claim 1, wherein the biomass being steam is biomass that comprises up to 35 percent corn cobs.

4. The method of claim 1, wherein the biomass being steam is biomass that comprises about 30 percent corn cobs.

5. The method of claim 1, wherein the steaming of biomass comprises steaming biomass that is up to 50 percent corn leaves and husks.

6. The method of claim 1, wherein the biomass being steamed is biomass comprising about 45 percent corn leaves and husks.

7. The method of claim 1, wherein the biomass being steamed is biomass comprising up to 30 percent corn stalks.

8. The method of claim 1, wherein the biomass being steamed is biomass including about 20 percent corn stalks.

9. The method of claim 1, wherein the steaming further comprises mixing the water with the biomass to a range of about 10 to 50 percent moisture.

10. The method of claim 1, wherein the biomass being steamed comprises about 30 to 55 percent cellulose.

11. The method of claim 1, wherein the biomass being steamed comprises about 20 to 50 percent hemicellulose.

12. The method of claim 1, wherein the biomass being steamed comprises about 10 to 25 percent lignin.

13. The method of claim 1, wherein the biomass being steamed comprises about 1 to 10 percent ash.

14. The method of claim 1, wherein the steaming comprises heating the biomass to about 100 degrees Celsius.

15. The method of claim 1, wherein the removing comprises forcing the biomass out of the first pretreatment reactor with water and mechanical agitation.

16. The method of claim 1, wherein the removing comprises counter current washing of the processed biomass.

17. The method of claim 1, wherein the liquids with sugars comprises 1 to 8 percent solids.

18. The method of claim 1, wherein the liquids with sugars comprises 1 to 6 percent solids.

19. The method of claim 1, wherein the liquids with sugars comprises 1 to 5 percent solids.

20. The method of claim 1, wherein the liquids with sugars comprises 1 to 4 percent solids.

21. The method of claim 1, wherein the liquids with sugars comprises 1 to 8 percent xylose.

22. The method of claim 1, wherein the liquids with sugars comprises 0 to 1 percent glucose.

23. The method of claim 1, wherein the liquids with sugars comprises 0 to 1 percent arabinose.

24. The method of claim 1, wherein the feeding comprises pressing the processed biomass to a consistency of 40 to 60 percent solids.

25. The method of claim 1, wherein the processed biomass comprises 45 to 70 percent cellulose.

26. The method of claim 1, wherein the process biomass comprises 5 to 20 percent hemicellulose.

27. The method of claim 1, wherein the processed biomass comprises 20 to 32 percent lignin.

28. The method of claim 1, wherein the processed biomass comprises 1 to 10 percent ash.

29. The method of claim 1, wherein the feeding comprises heating the processed biomass in a range of 150 degrees Celsius to about 210 degrees Celsius.

30. The method of claim 29, wherein the heating comprises applying direct contact steam to the processed biomass.

31. The method of claim 1, wherein the feeding comprises holding the processed biomass in the second pretreatment reactor for up to five minutes.

32. The method of claim 1, further comprising supplying an acid solution to the processed biomass.

33. The method of claim 32, wherein the acid solution is at an acid level from a range of 0.1 to 4.0 percent w/w.

34. The method of claim 32, wherein the acid solution is at an acid level from a range 0.25 to 2.0 percent w/w.

35. The method of claim 32, wherein the acid solution is at an acid level from a range 0.4 to 1.5 percent w/w.

36. The method of claim 32, wherein the acid solution is at an acid level from a range 0.5 to 1.25 percent w/w.

37. The method of claim 32, wherein the acid solution is at an acid level from about 0.75 to 1.0 percent w/w.

38. The method of claim 1, wherein the removing comprises conducting a steeping process at a temperature range from 50 degrees Celsius to 180 degrees Celsius.

39. The method of claim 1, wherein the removing comprises conducting a steeping process at a temperature range from 75 degrees Celsius to 170 degrees Celsius.

40. The method of claim 1, wherein the removing comprises conducting a steeping process at a temperature range from 100 degrees Celsius to 160degrees Celsius.

41. The method of claim 1, wherein the removing comprises conducting a steeping process at a temperature range from 100 degrees Celsius to 130degrees Celsius.

42. The method of claim 1, wherein the removing comprises conducting a steeping process at a temperature range from 100 degrees Celsius to 120degrees Celsius.

* * * * *